(12) United States Patent
Ito et al.

(10) Patent No.: US 10,930,951 B2
(45) Date of Patent: *Feb. 23, 2021

(54) FLOW BATTERY THAT INCLUDES ACTIVE MATERIAL

(71) Applicant: Panasonic Intellectual Property Management Co., Ltd., Osaka (JP)

(72) Inventors: Shuji Ito, Nara (JP); Masahisa Fujimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 71 days.

This patent is subject to a terminal disclaimer.

(21) Appl. No.: 16/112,303

(22) Filed: Aug. 24, 2018

(65) Prior Publication Data

US 2019/0081336 A1   Mar. 14, 2019

(30) Foreign Application Priority Data

Sep. 11, 2017   (JP) .............................. JP2017-174323

(51) Int. Cl.
*H01M 8/04276*   (2016.01)
*H01M 4/58*   (2010.01)
(Continued)

(52) U.S. Cl.
CPC ....... *H01M 8/04276* (2013.01); *H01M 4/587* (2013.01); *H01M 4/5825* (2013.01);
(Continued)

(58) Field of Classification Search
CPC .... H01M 8/04276; H01M 8/18; H01M 8/188; H01M 4/5825; H01M 4/587; H01M 4/62
See application file for complete search history.

(56) References Cited

U.S. PATENT DOCUMENTS

2011/0189520 A1* 8/2011 Carter ..................... H01M 8/20
429/107
2011/0200848 A1* 8/2011 Chiang ................... B60L 50/72
429/4
(Continued)

FOREIGN PATENT DOCUMENTS

JP   2014-524124   9/2014
JP   2016-085955   5/2016
(Continued)

*Primary Examiner* — Mayla Gonzalez Ramos
(74) *Attorney, Agent, or Firm* — McDermott Will and Emery LLP

(57) ABSTRACT

A flow battery includes: a cell including a first chamber and a second chamber a first liquid that contains a charge mediator and a discharge mediator, and that is located in the first chamber of the cell; a first electrode located in the first chamber of the cell; a first active material that is solid and that is located in the first chamber of the cell; a second liquid located in the second chamber of the cell; a second electrode that is located in the second chamber of the cell, and that is a counter electrode to the first electrode; and a first stirrer that stirs the first liquid in the first chamber. The charge mediator has a lower equilibrium potential than an equilibrium potential of the first active material. The discharge mediator has a higher equilibrium potential than the equilibrium potential of the first active material.

17 Claims, 4 Drawing Sheets

(51) Int. Cl.
*H01M 8/18* (2006.01)
*H01M 4/587* (2010.01)
*H01M 4/62* (2006.01)

(52) U.S. Cl.
CPC ............... *H01M 4/62* (2013.01); *H01M 8/18* (2013.01); *H01M 8/188* (2013.01)

(56) References Cited

U.S. PATENT DOCUMENTS

| | | | |
|---|---|---|---|
| 2012/0135278 A1* | 5/2012 | Yoshie | H01M 8/20 |
| | | | 429/7 |
| 2014/0134465 A1* | 5/2014 | Kumamoto | H01M 8/188 |
| | | | 429/61 |
| 2014/0178735 A1 | 6/2014 | Wang et al. | |
| 2015/0255803 A1* | 9/2015 | Delnick | H01M 4/9041 |
| | | | 429/498 |
| 2017/0062863 A1* | 3/2017 | Huang | H01M 8/188 |
| 2018/0048004 A1 | 2/2018 | Hojo | |

FOREIGN PATENT DOCUMENTS

| | | |
|---|---|---|
| JP | 2017-117752 | 6/2017 |
| WO | 2010/143634 | 12/2010 |
| WO | 2016/208123 | 12/2016 |

\* cited by examiner

FLOW BATTERY THAT INCLUDES ACTIVE MATERIAL

BACKGROUND

1. Technical Field

The present disclosure relates to a flow battery that includes an active material.

2. Description of the Related Art

Japanese Patent No. 5417441 discloses a redox flow battery that includes a negative-electrode liquid slurry containing a non-aqueous solvent and solid negative-electrode active material particles composed of metal particles.

WO 2016/208123 discloses a redox flow battery in which a non-aqueous solvent is circulated by a pump between a housing portion for housing a solid negative-electrode active material and an electrode.

SUMMARY

One non-limiting and exemplary embodiment provides a flow battery with high energy density and high reliability.

In one general aspect, the techniques disclosed here feature a flow battery includes: a cell including a first chamber and a second chamber; a first liquid that contains a charge mediator and a discharge mediator, and that is located in the first chamber of the cell; a first electrode located in the first chamber of the cell; a first active material that is solid and that is at least partly immersed in the first liquid in the first chamber of the cell; a second liquid located in the second chamber of the cell; a second electrode that is located in the second chamber of the cell, and that is a counter electrode to the first electrode; and a first stirrer that stirs the first liquid in the first chamber. The charge mediator has a lower equilibrium potential than an equilibrium potential of the first active material. The discharge mediator has a higher equilibrium potential than the equilibrium potential of the first active material.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure will be described below with reference to the accompanying drawings. In all drawings, the essentially same constituent elements are denoted by the same numerals and repeated descriptions will be omitted or simplified.

First Embodiment

Figure 1:
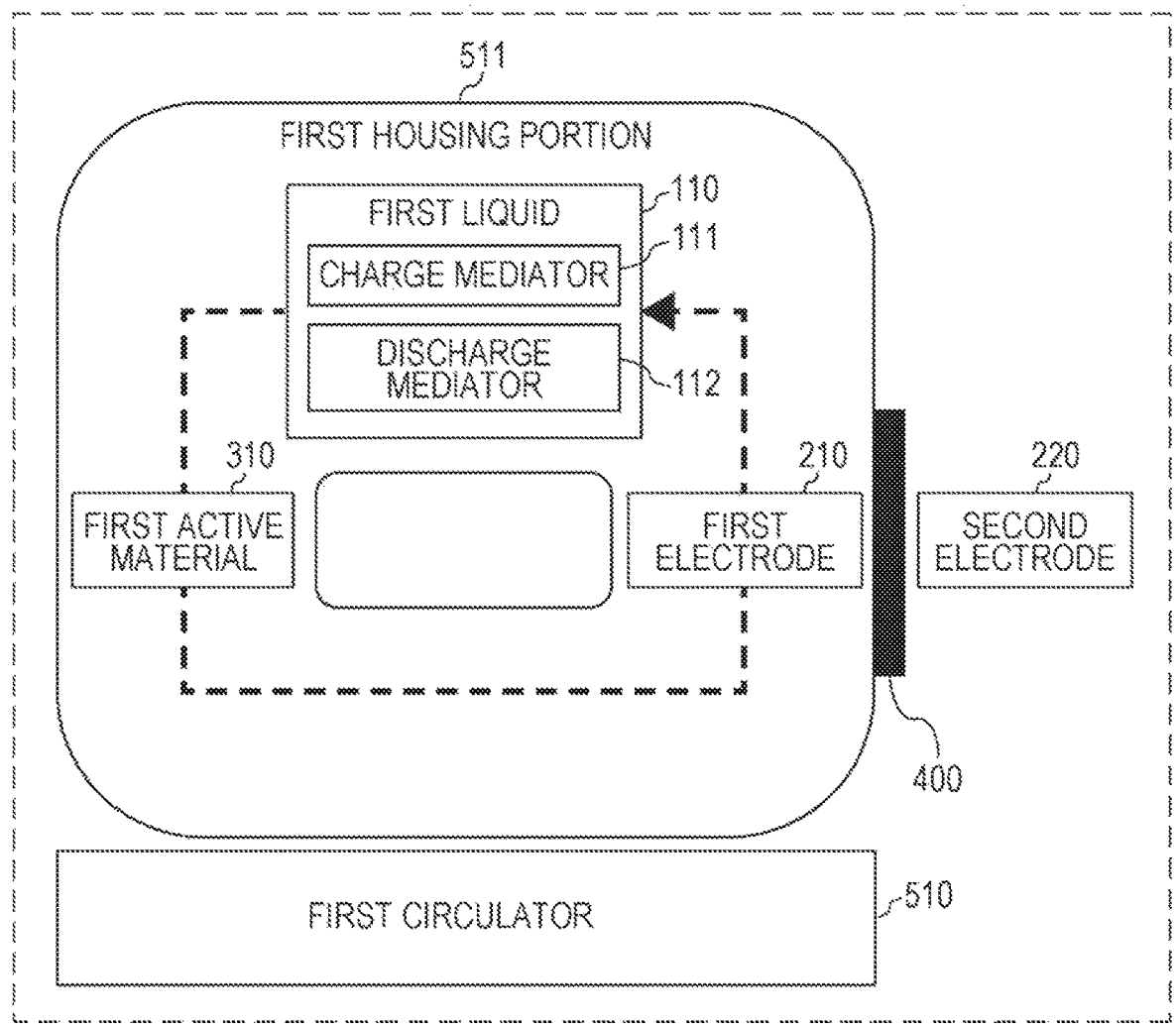
FIG. 1 is a schematic block diagram of a flow battery according to a first embodiment.

FIG. 1 is a schematic block diagram of a flow battery 1000 according to a first embodiment.

The flow battery 1000 according to the first embodiment includes a first liquid 110, a first electrode 210, and a first active material 310. The flow battery 1000 may further include a second electrode 220. The flow battery 1000 may also further include a second liquid described later.

The first liquid 110 contains a charge mediator 111 and a discharge mediator 112. More specifically, the first liquid 110 contains the charge mediator 111 and the discharge mediator 112 dissolved therein.

The first electrode 210 is at least partly immersed in the first liquid 110.

The first active material 310 is a solid active material (for example, an active material powder) at least partly immersed in the first liquid 110.

The charge mediator 111 has a lower equilibrium potential than an equilibrium potential of the first active material 310.

The discharge mediator 112 has a higher equilibrium potential than the equilibrium potential of the first active material 310.

The flow battery 1000 according to the first embodiment includes a first housing portion (an example of the first chamber) 511, which houses the first liquid 110, the first electrode 210, and the first active material 310. The flow battery 1000 may include a second housing portion (an example of the second chamber), which houses the second electrode 220 and the second liquid. The flow battery 1000 may further include a cell divided into the first housing portion and the second housing portion.

The flow battery 1000 according to the first embodiment includes a first circulator (an example of the first stirrer) 510. The first circulator 510 stirs (for example, circulates) the first liquid 110 in the first housing portion 511.

Such a structure can simultaneously improve the energy density, cycle life, and reliability of a flow battery.

A flow battery with such a structure can utilize an active material without circulating the active material. Thus, a high-capacity active material powder can be used as the first active material 310 in a charge-discharge reaction, for example. This can increase the energy density and capacity.

In a flow battery described in WO 2016/208123, an active material powder is housed in a tank outside a cell, an electrode is housed in the cell, and a pipe and a pump are disposed between the tank and the cell. In the structure of the present embodiment, a chamber in a cell houses the first liquid 110, the first electrode 210, and the solid first active material 310, such as an active material powder, and the first liquid 110 is stirred. Thus, the structure of the present embodiment can obviate the need for a pipe and a pump between the cell and the tank. The structure of the present embodiment can circulate only the first liquid 110 containing the charge mediator 111 and the discharge mediator 112 dissolved therein only in the first housing portion 511 without circulating the active material powder. This can prevent a pipe from being clogged with the active material powder. This can also prevent the degradation of the first liquid caused by a reaction between the first liquid and a resin constituting a pump. This can also prevent liquid leakage resulting from the degradation of the resin. Thus, the flow battery can have a long cycle life and high reliability.

In such a structure, when the first active material 310 has a relatively low equilibrium potential (vs. Li/Li$^+$), the discharge mediator 112 may be a material with a relatively low equilibrium potential (vs. Li/Li$^+$). The active material with a relatively low equilibrium potential to be used as the first active material 310 is graphite, for example. The material with a relatively low equilibrium potential to be used as the discharge mediator 112 is an aromatic compound, for example. This can decrease the electric potential of the negative electrode of the flow battery. This can increase the discharge voltage of the flow battery.

In the flow battery 1000 according to the first embodiment, the first liquid 110 may contain lithium dissolved therein.

The first active material 310 may occlude and release lithium.

When the flow battery 1000 is charged, electrons are supplied from the outside of the flow battery 1000 to the first electrode 210. When the flow battery 1000 is charged, the charge mediator 111 is reduced on the first electrode 210. When the flow battery 1000 is charged, the charge mediator 111 reduced on the first electrode 210 may be oxidized by the first active material 310, and the first active material 310 may occlude lithium.

When the flow battery 1000 is discharged, electrons are released from the first electrode 210 to the outside of the flow battery 1000. When the flow battery 1000 is discharged, the first active material 310 containing lithium reduces the discharge mediator 112 and releases lithium. When the flow battery 1000 is discharged, the discharge mediator 112 reduced by the first active material 310 may be oxidized on the first electrode 210.

In such a structure, the first active material 310 may reversibly occlude and release lithium and/or lithium ions. This facilitates the designing of the first active material 310. This can also further increase the capacity.

When the flow battery 1000 according to the first embodiment is charged, the discharge mediator 112 may be reduced on the first electrode 210.

During discharging, the charge mediator 111 may be oxidized on the first electrode 210.

Such a structure can further increase the energy density and capacity. More specifically, reduction of the discharge mediator 112 on the first electrode 210 during charging can increase the amount of the discharge mediator 112 to be oxidized on the first electrode 210 during discharging. Furthermore, oxidization of the charge mediator 111 on the first electrode 210 during discharging can increase the amount of the charge mediator 111 to be reduced on the first electrode 210 during charging. This can increase charge-discharge capacity.

For example, contact between the first liquid 110 and the first electrode 210 causes oxidation or reduction of the charge mediator 111 and the discharge mediator 112 on the first electrode 210.

For example, contact between the first liquid 110 and the first active material 310 causes a reduction reaction of the discharge mediator 112 with the first active material 310 or an oxidation reaction of the charge mediator 111 with the first active material 310.

In the flow battery 1000 according to the first embodiment, the charge mediator 111 and the discharge mediator 112 may independently be an aromatic compound.

The first liquid 110 containing an aromatic compound dissolved therein causes a solvated electron of lithium to be released and dissolves the lithium as a cation.

Such a structure can realize a base electric potential of the charge mediator 111 and the discharge mediator 112. A solution containing an aromatic compound can dissolve lithium, such as lithium metal. Such a solution containing an aromatic compound is an ether solution, for example. Lithium tends to release an electron and become a cation. Thus, lithium donates an electron to an aromatic compound in a solution and dissolves in the solution as a cation. The aromatic compound accepts the electron and solvates with the electron. The aromatic compound solvated with the electron behaves as an anion. Thus, the solution containing the aromatic compound is ion conductive by itself. The solution containing the aromatic compound contains the equivalent amounts of Li cations and electrons. Thus, the solution containing the aromatic compound can be highly reductive or have a base electric potential.

For example, an electrode that does not react with lithium and that is at least partly immersed in the first liquid 110 containing an aromatic compound dissolved therein has a relatively low electric potential (vs. Li/Li$^+$). The electric potential depends on the degree of solvation between the aromatic compound and an electron, that is, on the type of aromatic compound. Examples of the aromatic compound with a low electric potential include phenanthrene, biphenyl, o-terphenyl, triphenylene, anthracene, acenaphthene, acenaphthylene, fluoranthene, 1,10-phenanthroline, 2,2'-bipyridyl, benzophenone, trans-stilbene, 4,4'-bipyridyl, 3,3'-bipyridyl, 2,4'-bipyridyl, 2,3'-bipyridyl, cis-stilbene, acetophenone, propiophenone, butyrophenone, valerophenone, benzil, and tetraphenylcyclopentadienone. The charge mediator 111 and the discharge mediator 112 may independently contain ethylenediamine.

In the flow battery 1000 according to the first embodiment, the charge mediator 111 may be at least one selected from the group consisting of phenanthrene, biphenyl, o-terphenyl, triphenylene, anthracene, acenaphthene, acenaphthylene, and fluoranthene.

Such a structure can realize a base electric potential of the charge mediator 111. More specifically, the charge mediator 111 can have a lower electric potential (vs. Li/Li$^+$) than the first active material 310. The first active material 310 is graphite, for example.

In the flow battery 1000 according to the first embodiment, the discharge mediator 112 may be at least one selected from the group consisting of 1,10-phenanthroline, 2,2'-bipyridyl, benzophenone, trans-stilbene, 4,4'-bipyridyl, 3,3'-bipyridyl, 2,4'-bipyridyl, 2,3'-bipyridyl, cis-stilbene, acetophenone, propiophenone, butyrophenone, valerophenone, ethylenediamine, benzil, and tetraphenylcyclopentadienone.

Such a structure can realize a noble electric potential of the discharge mediator 112. More specifically, the discharge mediator 112 can have a higher electric potential (vs. Li/Li$^+$) than the first active material 310. The first active material 310 is graphite, for example.

In the flow battery 1000 according to the first embodiment, the discharge mediator 112 may be at least one selected from the group consisting of 2,2'-bipyridyl, trans-stilbene, 2,4'-bipyridyl, 2,3'-bipyridyl, cis-stilbene, propiophenone, butyrophenone, valerophenone, ethylenediamine, benzil, and tetraphenylcyclopentadienone.

Such a structure can realize a base electric potential of the discharge mediator 112. More specifically, the discharge mediator 112 can have a higher electric potential (vs. Li/Li$^+$)

than the first active material 310. Furthermore, the discharge mediator 112 can have a relatively low equilibrium potential (vs. Li/Li$^+$). This can decrease the electric potential of the negative electrode of the flow battery. This can increase the discharge voltage of the flow battery. The first active material 310 is graphite, for example.

In the flow battery 1000 according to the first embodiment, the first liquid 110 may contain an ether solution.

In such a structure, the first liquid 110 can be an electrolytic solution containing the charge mediator 111 and the discharge mediator 112. More specifically, the solvent of the charge mediator 111 and the discharge mediator 112 is an electronically non-conductive ether solution, and the ether solution itself can have the properties of an electrolytic solution.

Examples of ether include tetrahydrofuran (THF), 2-methyltetrahydrofuran (2MeTHF), dimethoxyethane (DME), 1,3-dioxane (1,3DO), and 4-methyl-1,3-dioxane (4Me1,3DO).

In the flow battery 1000 according to the first embodiment, the first active material 310 may contain graphite.

Such a structure can decrease the equilibrium potential (vs. Li/Li$^+$) of the first active material 310. Thus, the discharge mediator 112 can be a material with a relatively low equilibrium potential (vs. Li/Li$^+$). Such a material with a relatively low equilibrium potential for use as the discharge mediator 112 is an aromatic compound, for example. This can decrease the electric potential of the negative electrode of the flow battery. This can increase the discharge voltage of the flow battery.

In the first embodiment, graphite of the first active material 310 on which lithium is occluded or a graphite intercalation compound produced during charging may have a composition of at least one of $C_{24}Li$, $C_{18}Li$, $C_{12}Li$, and $C_6Li$.

When the first active material 310 is graphite ($C_6Li$), charging involves complete reduction by lithium. Thus, graphite occludes lithium and forms $C_6Li$. The $C_6Li$ has an electric potential of approximately 0.15 V vs. Li/Li$^+$. Thus, a mediator-type negative electrode can be formed by using an aromatic compound with a lower electric potential than $C_6Li$ as a charge mediator and by using an aromatic compound with a higher electric potential than $C_6Li$ as a discharge mediator.

Tables 1, 2, and 3 list the measured electric potentials of aromatic compounds that can be used as the charge mediator 111.

TABLE 2

| Compound | Molar concentration (M) | Potential (V vs. Li/Li$^+$) |
|---|---|---|
| 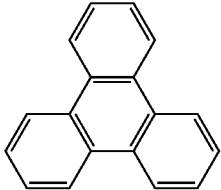 Triphenylene | 0.1 | 0.01 |
| 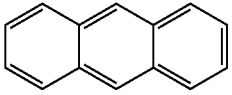 Anthracene | 0.1 | 0.05 |

TABLE 3

| Compound | Molar concentration (M) | Potential (V vs. Li/Li$^+$) |
|---|---|---|
| 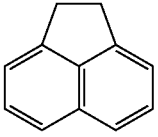 Acenaphthene | 0.1 | 0.016 |

TABLE 1

| Compound | Phenanthrene | Biphenyl | O-terphenyl |
|---|---|---|---|
| Molar concentration (M) | 1 | 1 | 1 |
| Li metal | Soluble (dark green) | Soluble (dark blue) | Soluble (reddish black) |
| C$_6$Li | No change | No change | No change |
| Potential (V vs. Li/Li$^+$) | 0.03 | 0 | 0.15 |

TABLE 3-continued

| Compound | Molar concentration (M) | Potential (V vs. Li/Li$^+$) |
|---|---|---|
| 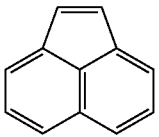 Acenaphthylene | 0.1 | 0.014 |
| 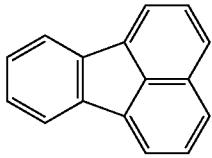 Fluoranthene | 0.1 | 0.014 |

Tables 4, 5, and 6 list the measured electric potentials of aromatic compounds and ethylenediamine that can be used as the discharge mediator 112.

TABLE 4

| Compound | 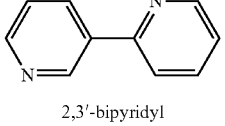 1,10-phenanthroline | 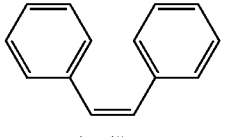 2,2'-bipyridyl | 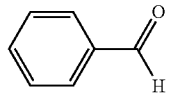 Benzophenone | 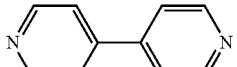 trans-stilbene |
|---|---|---|---|---|
| Molar concentration (M) | 0.1 | 1 | 1 | 0.5 |
| Li metal | Soluble (yellow) | Soluble (red) | Soluble (blue) | Soluble (dark red) |
| C$_6$Li | Li release (yellow) | Li release (red) | Li release (blue) | Li release (dark red) |
| Reaction rate | Slow | Slightly fast | Fast | Very slow |
| Potential (V vs. Li/Li$^+$) | 1.78 | 0.4 | 0.78 | 0.3 |

TABLE 5

| Compound | Molar concentration (M) | Potential (V vs. Li/Li$^+$) |
|---|---|---|
| 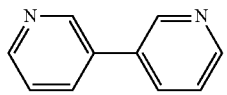 4,4'-bipyridyl | 0.1 | 1.22 |
| 3,3'-bipyridyl | 0.1 | 2.5 |
| 2,4'-bipyridyl | 0.1 | 0.54 |

TABLE 5-continued

| Compound | Molar concentration (M) | Potential (V vs. Li/Li$^+$) |
|---|---|---|
| 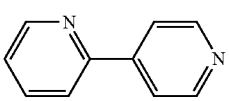 2,3'-bipyridyl | 0.1 | 0.58 |
| cis-stilbene | 0.1 | 0.43 |
| Acetophenone | 0.1 | 1.29 |

TABLE 5-continued

| Compound | Molar concentration (M) | Potential (V vs. Li/Li$^+$) |
|---|---|---|
| 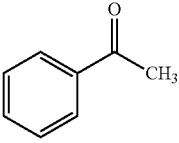 Propiophenone | 0.1 | 0.42 |
| 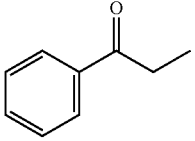 Butyrophenone | 0.1 | 0.3 |

TABLE 5-continued

| Compound | Molar concentration (M) | Potential (V vs. Li/Li$^+$) |
|---|---|---|
| Valerophenone | 0.1 | 0.31 |
| Ethylenediamine | 0.1 | 0.36 |

TABLE 6

| Compound | Molar concentration (M) | Potential (V vs. Li/Li$^+$) |
|---|---|---|
| Benzil | 0.1 | 0.16 |
| Tetraphenylcyclopentadienone | 0.1 | 0.34 |

A 2×2 cm$^2$ copper foil was covered with a polypropylene microporous separator, which was covered with a large amount of lithium metal foil. A tab was then attached to the copper foil and lithium metal. Subsequently, a laminate exterior was attached. After pouring 2MeTHF in which an aromatic compound was dissolved at a molar concentration (M) listed in Tables 1 to 6, the laminate exterior was hermetically sealed by heat. Thus, an electrometric cell for each aromatic compound was prepared. Tables 1 to 6 list the electric potentials (V vs. Li/Li$^+$) based on lithium metal measured with the electrometric cells. Although 2MeTHF was used in this measurement, another ether may also be used.

Li metal was dissolved in a 2MeTHF solution containing a charge mediator at a concentration of 0.1 M. Graphite was immersed in the solution for four days. The graphite (black) became C$_6$Li (gold) as evidenced by a color change. C$_6$Li was immersed for four days in a 2MeTHF solution containing a discharge mediator at a concentration of 0.1 M. The C$_6$Li (gold) became graphite (black) as evidenced by a color change. A color change from gold to black was visually examined to relatively assess the Li release rate of each aromatic compound listed in Table 4.

Tables 1 and 4 show the change of C$_6$Li and lithium metal immersed in 2MeTHF containing an aromatic compound dissolved therein.

Tables 1 and 4 show that in both the charge mediator 111 and the discharge mediator 112 lithium metal dissolved and changed the color of the solution.

Table 1 shows that the charge mediator 111 cannot dissolve Li of C$_6$Li.

Table 4 shows that the discharge mediator 112 can dissolve Li of C$_6$Li.

This difference results from the difference between the electric potential of C$_6$Li and the electric potentials of these lithium metal solutions. Those with a higher electric potential than C$_6$Li (approximately 0.15 V vs. Li/Li$^+$) can dissolve Li of C$_6$Li. In contrast, those with a lower electric potential than C$_6$Li (approximately 0.15 V vs. Li/Li$^+$) cannot dissolve Li of C$_6$Li.

Thus, those with a lower electric potential than C$_6$Li can be used as the charge mediator 111. Those with a higher electric potential than C$_6$Li can be used as the discharge mediator 112.

A smaller potential difference between the aromatic compound and the first active material 310 results in higher charge-discharge energy efficiency. When the first active material 310 is graphite (C$_6$Li), therefore, the charge mediator 111 may be phenanthrene, triphenylene, or biphenyl. The discharge mediator 112 may be trans-stilbene, butyrophenone, valerophenone, or ethylenediamine. This can further increase charge-discharge energy efficiency.

Unlike Li ions, the ether may not be intercalated into graphite. No co-intercalation of Li and the ether in graphite can increase the capacity density.

The first active material 310 may be an active material powder. Storage of the first active material 310 as an unprocessed powder in a tank can simplify production and reduce production costs.

The first active material 310 may be active material pellets. The active material pellets may be formed by pelletizing an active material powder. Storage of the first active material 310 as pellets in a tank can simplify production and reduce production costs.

The first active material 310 may be an active material pelletized with a known binder. The binder may be poly(vinylidene difluoride), polypropylene, polyethylene, or polyimide.

The first active material 310 may be a material that is insoluble in the first liquid 110. Thus, there is provided a flow battery in which the charge mediator 111 and the discharge mediator 112 as well as the first liquid 110 are circulated, but the first active material 310 is not circulated.

The flow battery 1000 according to the first embodiment may include the first electrode 210 as a negative electrode and a second electrode 220 as a positive electrode.

When the second electrode 220 has a relatively low electric potential, the first electrode 210 may function as a positive electrode.

Thus, the first electrode 210 may be a positive electrode, and the second electrode 220 may be a negative electrode.

The first electrode 210 may have a surface that acts as a reaction field for the charge mediator 111 and the discharge mediator 112.

In this case, the material of the first electrode 210 may be stable in the first liquid 110. The material of the first electrode 210 may also be resistant to an electrode reaction, that is, an electrochemical reaction. For example, the first electrode 210 may be formed of a metal or carbon. Examples of the metal include stainless steel, iron, copper, and nickel.

The first electrode 210 may have an increased surface area. Examples of such a structure with an increased surface area include meshes, nonwoven fabrics, surface-roughened sheets, and sintered porous bodies. Thus, the first electrode 210 may have an increased specific surface area. This can promote an oxidation or reduction reaction of the charge mediator 111 and the discharge mediator 112.

The second electrode 220 may include a current collector and an active material on the current collector. Thus, for example, a high-capacity active material may be used. An active material of the second electrode 220 may be a compound that reversibly occludes and releases lithium ions.

The second electrode 220 may be made of lithium metal. The second electrode 220 made of lithium metal can easily control dissolution and precipitation as a metal positive electrode and achieve high capacity.

The flow battery 1000 according to the first embodiment may further include a separator 400.

The separator 400 separates the first electrode 210 and the first liquid 110 from the second electrode 220.

The separator 400 may be a microporous film and/or a porous body for use in known secondary batteries.

The separator 400 may be a porous film, such as glass paper, which is a nonwoven fabric with glass fibers woven in.

The separator 400 may be a membrane with ionic conductivity, such as a lithium-ion-conducting membrane. For example, the separator 400 may be an ion-exchange resin membrane or a solid electrolyte membrane. The ion-exchange resin membrane may be a cation-exchange membrane or an anion-exchange membrane.

In the flow battery 1000 according to the first embodiment, the first circulator 510 circulates the first liquid 110 between the first electrode 210 and the first active material 310 in the first housing portion 511.

Such a structure can circulate the charge mediator 111 and the discharge mediator 112 together with the first liquid 110 between the first electrode 210 and the first active material 310. This can efficiently promote an oxidation reaction and a reduction reaction between the materials.

The first circulator 510 does not need a pipe or a pump, for example.

Such a structure can prevent a pipe from being clogged and prevent liquid leakage due to degradation resulting from a reaction between a resin component of a pump and the first liquid containing the mediators dissolved therein. Examples of the resin component of a pump include diaphragms of diaphragm pumps, O-rings that support a plunger in plunger pumps, and seal components on liquid transfer lines.

The first circulator 510 may include at least one first rotator and a first drive for rotating the rotator. The first drive can rotate the first rotator. The first drive may not be in contact with the first liquid 110. The first circulator 510 may be a magnetic stirrer that includes at least one first rotator and a stirrer main body. In the first circulator 510, the first rotator may be disposed at the bottom of the first housing portion 511, and the first drive may be disposed under the first housing portion 511. The first drive may be disposed outside the first housing portion 511, and the first rotator may be disposed within the first housing portion 511.

A specific example of the first circulator 510 may be a structure described later in a second embodiment.

Charge-Discharge Process

The charge-discharge process of the flow battery 1000 according to the first embodiment will be described below.

The charge-discharge process is specifically described with the following operation example.

In the operation example, the first electrode 210 is a negative electrode made of stainless steel.

In the operation example, the first liquid 110 is an ether solution containing the charge mediator 111 and the discharge mediator 112 dissolved therein.

In the operation example, the charge mediator 111 is an aromatic compound (hereinafter referred to as ChMd).

In the operation example, the discharge mediator 112 is an aromatic compound (hereinafter referred to as DchMd).

In the operation example, the first active material 310 is graphite ($C_6Li$).

In the operation example, the second electrode 220 is a positive electrode. The second electrode 220 includes a current collector (stainless steel) and an active material lithium iron phosphate ($LiFePO_4$) on the current collector.

Charging Process

First, a charge reaction will be described below.

A voltage is applied between the first electrode 210 and the second electrode 220 for charging.

Reaction on Positive Electrode

Voltage application causes an oxidation reaction of the active material on the positive electrode, that is, on the second electrode 220. The active material on the positive electrode releases lithium ions. Thus, electrons are released from the second electrode 220 to the outside of the flow battery.

For example, the following reaction occurs in the operation example.

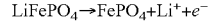
$$LiFePO_4 \rightarrow FePO_4 + Li^+ + e^-$$

Lithium ions ($Li^+$) thus released may move partly to the first liquid 110 through the separator 400.

Reaction on Negative Electrode

Upon application of a voltage, electrons are supplied to the negative electrode, that is, to the first electrode 210 from the outside of the flow battery. This causes a reduction reaction of the charge mediator 111 and the discharge mediator 112 on the first electrode 210.

For example, the following reaction occurs in the operation example.

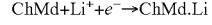
$$ChMd + Li^+ + e^- \rightarrow ChMd.Li$$

$$DchMd + Li^+ + e^- \rightarrow DchMd.Li$$

The first circulator 510 transfers the charge mediator 111 reduced on the first electrode 210 to the first active material 310. In other words, the first circulator 510 supplies the charge mediator 111 reduced on the first electrode 210 to the first active material 310.

The charge mediator 111 reduced on the first electrode 210 is oxidized by the first active material 310. In other words, the first active material 310 is reduced by the charge mediator 111. Thus, the first active material 310 occludes lithium and becomes $C_6Li$.

For example, the following reaction occurs in the operation example.

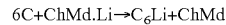
$$6C + ChMd.Li \rightarrow C_6Li + ChMd$$

The first circulator 510 transfers the charge mediator 111 oxidized by the first active material 310 to the first electrode 210. In other words, the first circulator 510 supplies the charge mediator 111 oxidized by the first active material 310 to the first electrode 210.

Thus, the charge mediator 111 is unchanged in the whole reaction including circulation.

Meanwhile, the first active material 310 separated from the first electrode 210 is charged.

The charge reaction may continue until the first active material 310 or the active material on the positive electrode side reaches the fully charged state.

Discharge Process

A discharge reaction starting from the fully charged state will be described below.

In the fully charged state, the first active material 310 and the active material on the positive electrode side are in the charged state.

During the discharge reaction, electric power is generated between the first electrode 210 and the second electrode 220.

Reaction on Positive Electrode

When the flow battery is discharged, electrons are supplied to the positive electrode, that is, to the second electrode 220 from the outside of the flow battery. This causes a reduction reaction of the active material on the second electrode 220.

For example, the following reaction occurs in the operation example.

$$FePO_4 + Li^+ + e^- \rightarrow LiFePO_4$$

Lithium ions ($Li^+$) may be supplied partly from the first liquid 110 through the separator 400.

Reaction on Negative Electrode

Battery discharge causes an oxidation reaction of the charge mediator 111 and the discharge mediator 112 on the negative electrode, that is, on the first electrode 210. Thus, electrons are released from the first electrode 210 to the outside of the flow battery.

For example, the following reaction occurs in the operation example.

$$DchMd.Li \rightarrow DchMd + Li^+ + e^-$$

$$ChMd.Li \rightarrow ChMd + Li^+ e^-$$

The first circulator 510 transfers the discharge mediator 112 oxidized on the first electrode 210 to the first active material 310. In other words, the first circulator 510 supplies the discharge mediator 112 oxidized on the first electrode 210 to the first active material 310.

The discharge mediator 112 oxidized on the first electrode 210 is reduced by the first active material 310. In other words, the first active material 310 is oxidized by the discharge mediator 112. Thus, the first active material 310 releases lithium.

For example, the following reaction occurs in the operation example.

$$C_6Li + DchMd \rightarrow 6C + DchMd.Li$$

The first circulator 510 transfers the discharge mediator 112 reduced by the first active material 310 to the first electrode 210. In other words, the first circulator 510 supplies the discharge mediator 112 reduced by the first active material 310 to the first electrode 210.

Thus, the discharge mediator 112 is unchanged in the whole reaction including circulation.

Meanwhile, the first active material 310 separated from the first electrode 210 is in the discharged state.

The discharge reaction may continue until the first active material 310 or the active material on the positive electrode side reaches the fully discharged state.

Second Embodiment

A second embodiment will be described below. The contents described in the first embodiment are appropriately omitted to avoid overlap.

Figure 2:
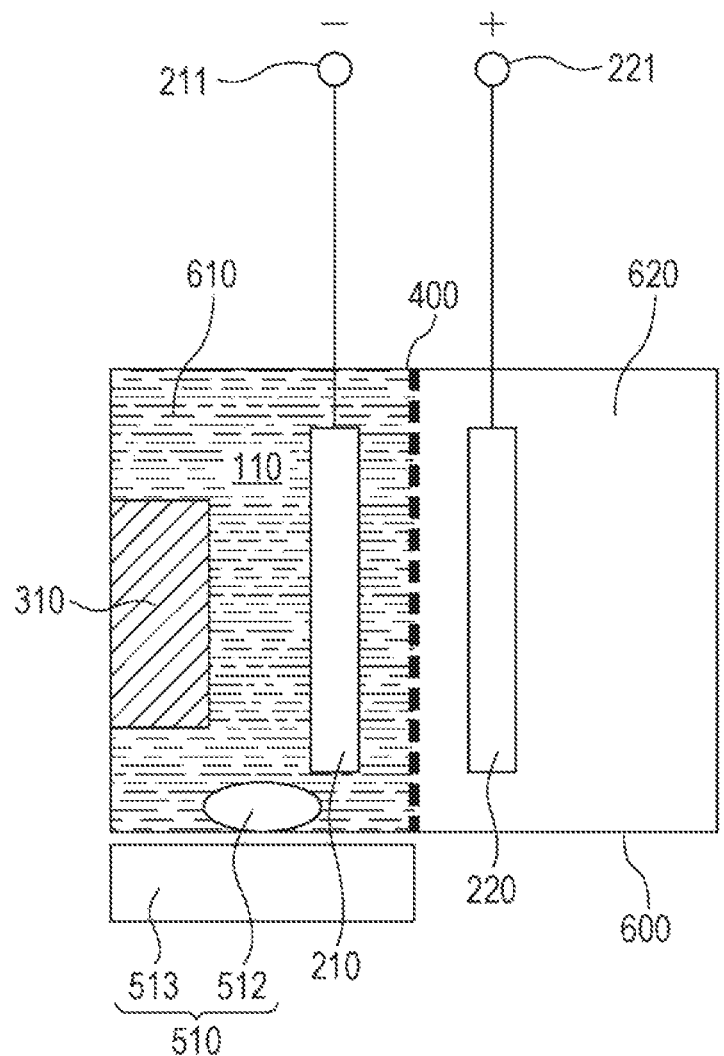
FIG. 2 is a schematic view of a flow battery according to a second embodiment.

FIG. 2 is a schematic view of a flow battery 2000 according to the second embodiment.

In addition to the components of the flow battery 1000 according to the first embodiment, the flow battery 2000 according to the second embodiment further includes the following components.

The flow battery 2000 according to the second embodiment includes the first circulator 510 and a negative-electrode chamber 610 (corresponding to the first housing portion 511 in the first embodiment), which also functions as an electrochemical reaction unit.

The first active material 310, the first liquid 110, and the first electrode 210 are housed in the negative-electrode chamber 610. During charging and discharging, the first liquid 110, the first electrode 210, and the first active material 310 cause an electrochemical reaction in the negative-electrode chamber 610.

The first circulator 510 circulates the first liquid 110 in the negative-electrode chamber 610.

Contact between the first active material 310 and the first liquid 110 in the negative-electrode chamber 610 causes at least one of an oxidation reaction of the charge mediator 111 with the first active material 310 and a reduction reaction of the discharge mediator 112 with the first active material 310.

In such a structure, the first liquid 110 can come into contact with the first active material 310 in the negative-electrode chamber 610. This can increase the contact area between the first liquid 110 and the first active material 310, for example. This can also increase the contact time between the first liquid 110 and the first active material 310. This can efficiently promote an oxidation reaction of the charge mediator 111 with the first active material 310 and a reduction reaction of the discharge mediator 112 with the first active material 310.

In the second embodiment, the negative-electrode chamber 610 also functions as an electrochemical reaction unit, for example.

The negative-electrode chamber 610 may contain the first liquid 110, which contains the charge mediator 111 and the discharge mediator 112 dissolved therein, in voids of the first active material 310.

As illustrated in FIG. 2, the flow battery 2000 according to the second embodiment may further include a cell 600, a positive-electrode terminal 221, and a negative-electrode terminal 211.

The cell 600 is divided into the negative-electrode chamber 610 and a positive-electrode chamber 620 by the separator 400.

An electrode acting as a negative electrode is disposed in the negative-electrode chamber 610. In FIG. 2, the first electrode 210 is disposed in the negative-electrode chamber 610.

The negative-electrode terminal 211 is coupled to the electrode acting as a negative electrode.

An electrode acting as a positive electrode is disposed in the positive-electrode chamber 620. In FIG. 2, the second electrode 220 is disposed in the positive-electrode chamber 620.

The positive-electrode terminal 221 is coupled to the electrode acting as a positive electrode.

The negative-electrode terminal 211 and the positive-electrode terminal 221 are coupled to a charge-discharge apparatus, for example. The charge-discharge apparatus applies a voltage between the negative-electrode terminal 211 and the positive-electrode terminal 221 or generates electric power between the negative-electrode terminal 211 and the positive-electrode terminal 221.

As illustrated in FIG. 2, in the flow battery 2000 according to the second embodiment, the first circulator 510 may include at least one first rotator 512 and a first drive 513 for rotating the first rotator 512. The first rotator 512 may be housed in the negative-electrode chamber 610. The first drive 513 may not be in contact with the first liquid 110. In other words, the first drive 513 may be disposed outside the negative-electrode chamber 610, and the first rotator 512 may be disposed within the negative-electrode chamber 610. The number of first rotators 512 in the negative-electrode chamber 610 is one or more and may be two or more. The first circulator 510 may be a magnetic stirrer that includes at least one first rotator 512 and a stirrer main body. When the first circulator 510 is a magnetic stirrer, the first drive 513 is a stirrer main body.

The stirrer main body 513 of the magnetic stirrer may be disposed under the negative-electrode chamber 610 in such a manner as not to come into contact with the first liquid 110. The first rotator 512 may be disposed at the bottom of the negative-electrode chamber 610. Thus, the stirrer main body 513 is disposed outside the negative-electrode chamber 610, and the first rotator 512 is disposed within the negative-electrode chamber 610.

Such a structure can prevent the first active material 310 from flowing out of the negative-electrode chamber 610 (for example, to the first electrode 210). Thus, the first active material 310 remains in the negative-electrode chamber 610. Thus, the first active material 310 is not circulated in the flow battery. This can prevent clogging of a component (for example, a pipe) in the first circulator 510 with the first active material 310.

The material of the first rotator 512 may be a material that does not react with the first active material 310 or the first liquid 110. The material of the first rotator 512 may be stainless steel, which does not react with metallic lithium, or a material covered with polyethylene, polypropylene, or poly(vinylidene difluoride). The first rotator 512 may have a center belt, roller, octagonal ring, rugby ball, stick, round, slim end, star head, or cross shape.

The first drive 513 of the first circulator 510 can drive the first rotator 512 without coming into contact with the first liquid 110 and can thereby circulate the first liquid 110 in the negative-electrode chamber 610 without using a pump. Thus, the present embodiment is different from a system equipped with a pump a component (for example, a gasket) of which comes into contact with the first liquid 110 and deteriorates due to a reaction. This can also prevent liquid leakage to the outside.

Such a structure can prevent the first active material 310 from flowing out of the negative-electrode chamber 610 even when the flow of the first liquid 110 causes the flow of the first active material 310 in the negative-electrode chamber 610.

As illustrated in FIG. 2, the first liquid 110 in the negative-electrode chamber 610 is stirred with the first rotator 512 and is circulated in the negative-electrode chamber 610. Thus, the charge mediator 111 and the discharge mediator 112 dissolved in the first liquid 110 are oxidized or reduced on the first electrode 210.

Thus, the charge mediator 111 and the discharge mediator 112 dissolved in the first liquid 110 are subjected to at least one of an oxidation reaction of the charge mediator 111 with the first active material 310 and a reduction reaction of the discharge mediator 112 with the first active material 310.

In FIG. 2, by way of example, the first electrode 210 is a negative electrode, and the second electrode 220 is a positive electrode.

When the second electrode 220 has a relatively low electric potential, the first electrode 210 may function as a positive electrode.

Thus, the first electrode 210 may be a positive electrode, and the second electrode 220 may be a negative electrode.

Separated by the separator 400, the negative-electrode chamber 610 and the positive-electrode chamber 620 may contain an electrolytic solution and/or solvent with a different composition.

The positive-electrode chamber 620 and the negative-electrode chamber 610 may contain an electrolytic solution and/or solvent with the same composition.

Third Embodiment

A third embodiment will be described below. The contents described in the first or second embodiment are appropriately omitted to avoid overlap.

In the third embodiment, an electrolytic solution is stirred (for example, circulated) on both the first electrode side and the second electrode side.

Figure 3:
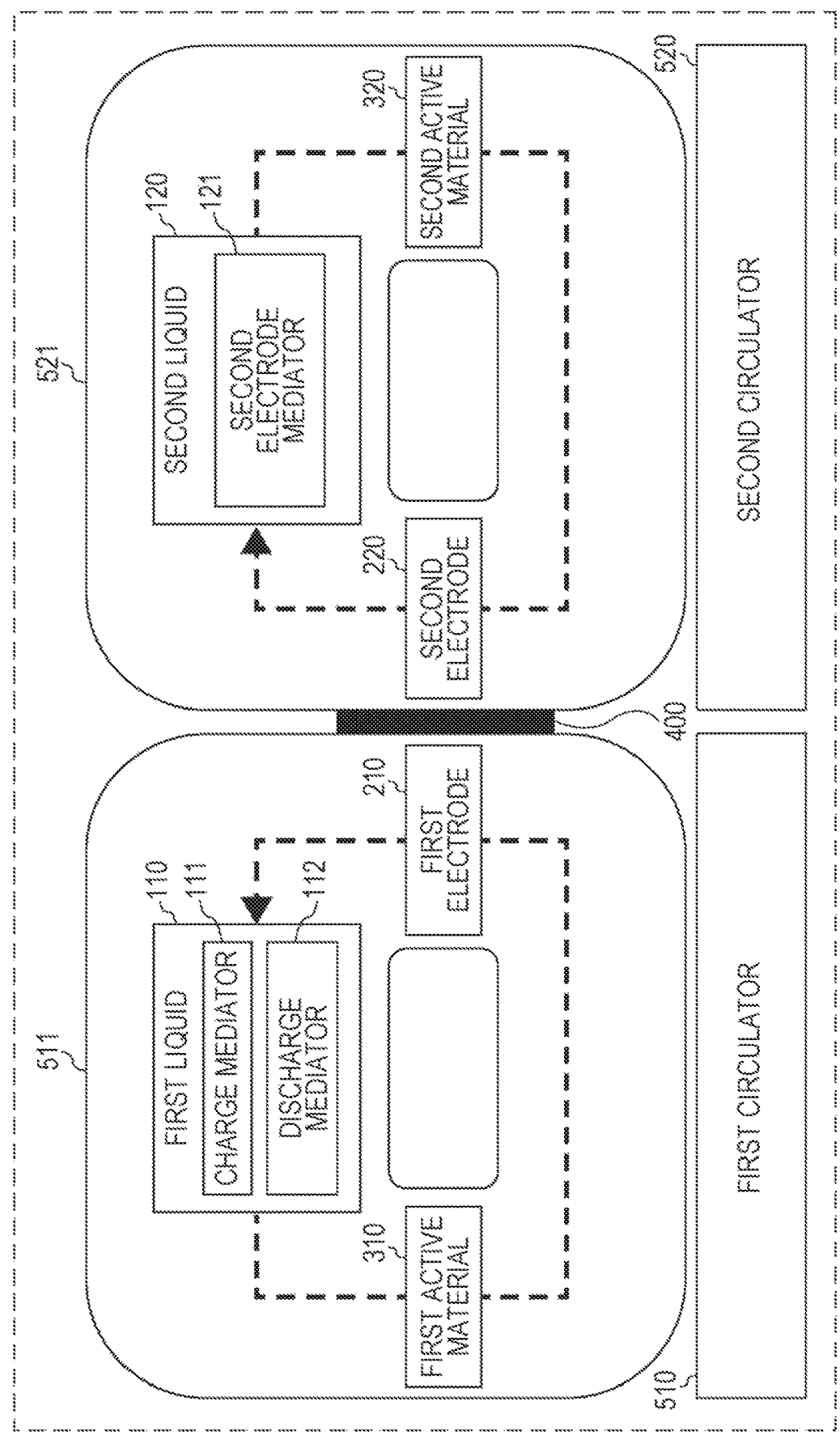
FIG. 3 is a schematic block diagram of a flow battery according to a third embodiment.

FIG. 3 is a schematic block diagram of a flow battery 3000 according to the third embodiment.

In addition to the components of the flow battery 1000 according to the first embodiment, the flow battery 3000 according to the third embodiment further includes the following components.

The flow battery 3000 according to the third embodiment further includes a second liquid 120, the second electrode 220, a second active material 320, and a second circulator 520 (an example of a second stirrer).

The second liquid 120 contains a second electrode mediator 121. More specifically, the second liquid 120 contains the second electrode mediator 121 dissolved therein.

The second electrode 220 is a counter electrode to the first electrode 210. The second electrode 220 is at least partly immersed in the second liquid 120.

The second active material 320 is at least partly immersed in the second liquid 120.

The second electrode mediator 121 is oxidized and reduced on the second electrode 220.

The second electrode mediator 121 is oxidized and reduced by the second active material 320.

Such a structure can simultaneously improve the energy density and cycle life of a flow battery.

A flow battery with such a structure can utilize an active material without circulating the active material. Thus, a high-capacity active material powder can be used as the second active material 320 in a charge-discharge reaction, for example. This can increase the energy density and capacity. The battery capacity is calculated by "positive-electrode capacity density×negative-electrode capacity density/(positive-electrode capacity density+negative-electrode capacity density)". Thus, a mediator-type flow battery structure on both the first electrode 210 side and the second electrode 220 side can significantly improve the capacity density.

Such a structure can circulate only the second liquid 120 containing the second electrode mediator 121 dissolved therein without circulating an active material powder. This can reduce the occurrence of clogging of a pipe with the active material powder. This can increase the cycle life of the flow battery.

In such a structure, when the second active material 320 has a relatively high equilibrium potential (vs. $Li/Li^+$), the second electrode mediator 121 may be a material with a relatively high equilibrium potential (vs. $Li/Li^+$). The active material with a relatively high equilibrium potential to be used as the second active material 320 is lithium iron phosphate, for example. The material with a relatively high equilibrium potential to be used as the second electrode mediator 121 is tetrathiafulvalene, for example. This can increase the electric potential of the positive electrode of the flow battery. This can increase the discharge voltage of the flow battery.

In the flow battery 3000 according to the third embodiment, the second liquid 120 may contain lithium dissolved therein.

The second active material 320 may occlude and release lithium.

When the flow battery 3000 is charged, electrons are supplied from the outside of the flow battery 3000 to the first electrode 210, and electrons are released from the second electrode 220 to the outside of the flow battery 3000.

When the flow battery 3000 is charged, the second electrode mediator 121 is oxidized on the second electrode 220, the second electrode mediator 121 oxidized on the second electrode 220 is reduced by the second active material 320, and the second active material 320 may release lithium.

When the flow battery 3000 is discharged, electrons are released from the first electrode 210 to the outside of the flow battery 3000, and electrons are supplied from the outside of the flow battery 3000 to the second electrode 220. When the flow battery 3000 is discharged, the second electrode mediator 121 is reduced on the second electrode 220, the second electrode mediator 121 reduced on the second electrode 220 is oxidized by the second active material 320, and the second active material 320 may occlude lithium.

In such a structure, the second active material 320 may reversibly occlude and release lithium (for example, lithium ions). This facilitates the designing of the second active material 320. This can also further increase the capacity.

For example, contact between the second liquid 120 and the second electrode 220 causes oxidation or reduction of the second electrode mediator 121 on the second electrode 220.

For example, contact between the second liquid 120 and the second active material 320 causes oxidation or reduction of the second electrode mediator 121 with the second active material 320.

In the flow battery 3000 according to the third embodiment, the redox potential region of the second electrode mediator 121 may overlap the redox potential region of the second active material 320.

Such a structure allows the second active material 320 to cause oxidation and reduction of the second electrode mediator 121.

In the flow battery 3000 according to the third embodiment, the upper limit in the redox potential region of the second electrode mediator 121 may be higher than the upper limit in the redox potential region of the second active material 320.

The lower limit in the redox potential region of the second electrode mediator 121 may be lower than the lower limit in the redox potential region of the second active material 320.

Such a structure can sufficiently (for example, approximately 100%) utilize the capacity of the second active material 320. Thus, the flow battery can have a higher capacity.

The second electrode mediator 121 may be a redox species with a plurality of redox potentials.

The second electrode mediator 121 may also be a mixture of redox species with certain redox potentials.

In the flow battery 3000 according to the third embodiment, the second electrode mediator 121 may be an organic compound with oxidation and reduction characteristics.

Such a structure can increase the solubility of the second electrode mediator 121 in the second liquid 120. The second liquid 120 is a non-aqueous solvent, for example.

In the flow battery 3000 according to the third embodiment, the second electrode mediator 121 may be an organic compound with multiple redox potentials. The multiple redox potentials are two or more redox potentials, for example.

Such an organic compound that can cause multistep oxidation-reduction may be an organic compound with a n-conjugated electron cloud, such as a tetrathiafulvalene derivative, a quinone derivative, or tetracyanoquinodimethane (TCNQ).

In the flow battery 3000 according to the third embodiment, the second electrode mediator 121 may be tetrathiafulvalene.

In such a structure, the second electrode mediator 121 can have two relatively high redox potentials. The two relatively high redox potentials may be a lower limit of approximately 3.4 V and an upper limit of approximately 3.7 V versus the lithium reference potential. This can increase the electric potential of the positive electrode of the flow battery. This can increase the discharge voltage of the flow battery.

In the flow battery 3000 according to the third embodiment, the second active material 320 may reversibly occlude and release lithium ions. For example, the second active material 320 may be a known active material for secondary batteries. Such an active material for secondary batteries is a transition metal oxide, fluoride, polyanion, fluorinated polyanion, or transition metal sulfide, for example.

In the flow battery 3000 according to the third embodiment, the second active material 320 may contain lithium iron phosphate.

Such a structure can increase the equilibrium potential (vs. Li/Li$^+$) of the second active material 320. Thus, the second electrode mediator 121 can be a material with a relatively high equilibrium potential (vs. Li/Li$^+$), such as tetrathiafulvalene. This can increase the electric potential of the positive electrode of the flow battery. This can increase the discharge voltage of the flow battery.

Compounds containing iron, manganese, or lithium or compounds containing vanadium have a redox potential in the range of 3.2 to 3.7 V vs. lithium. Compounds containing iron, manganese, or lithium include LiFePO$_4$ and LiMnO$_2$, for example. Compounds containing vanadium include V$_2$O$_5$, for example. Thus, when the second active material 320 is LiFePO$_4$, the second electrode mediator 121 may be tetrathiafulvalene.

In the flow battery 3000 according to the third embodiment, the second electrode mediator 121 may be a quinone derivative. The quinone derivative has multiple redox potentials in the range of 1 to 3 V vs. lithium, for example. In this case, the second active material 320 may be a material with a redox potential in the range of 1 to 3 V vs. lithium. The material with a redox potential in the range of 1 to 3 V vs. lithium may be a compound containing titanium, niobium, or lithium. The compound containing titanium, niobium, or lithium is Li$_4$Ti$_5$O$_{12}$ or LiNbO$_3$, for example.

In the flow battery 3000 according to the third embodiment, the second electrode mediator 121 may be metal-containing ions. The metal-containing ions are vanadium ions, manganese ions, or molybdenum ions with multiple redox potentials, for example. For example, vanadium ions have various reaction steps, such as divalent and trivalent, trivalent and tetravalent, or tetravalent and pentavalent.

The second active material 320 may be an active material powder. Storage of the second active material 320 as an unprocessed powder in a tank can simplify production and reduce production costs.

The second active material 320 may be active material pellets. The active material pellets may be formed by pelletizing an active material powder. Storage of the second active material 320 as pellets in a tank can simplify production and reduce production costs.

The second active material 320 may be an active material pelletized with a known binder. The binder may be poly (vinylidene difluoride), polypropylene, polyethylene, or polyimide.

The second active material 320 may be fixed as a film on metal foil.

The second active material 320 may contain a known conductive aid or ionic conductor. The conductive aid is carbon black or polyaniline, for example. The ionic conductor is poly(methyl methacrylate) or poly(ethylene oxide), for example.

The second active material 320 may be insoluble in the second liquid 120. Thus, there is provided a flow battery in which the second electrode mediator 121 as well as the second liquid 120 are circulated, but the second active material 320 is not circulated.

The second liquid 120 is a known non-aqueous electrolytic solution for secondary batteries, for example. For example, the non-aqueous electrolytic solution contains a known electrolyte salt dissolved in a non-aqueous solvent. The electrolyte salt may be composed of lithium ions and anions.

The non-aqueous solvent may typically be a known non-aqueous solvent for secondary batteries. Examples of the non-aqueous solvent include cyclic and chain carbonates, cyclic and chain esters, cyclic and chain ethers, nitriles, cyclic and chain sulfones, and cyclic and chain sulfoxides.

The first liquid 110 and the second liquid 120 may contain different solvents or the same solvent.

The flow battery 3000 according to the third embodiment may include the first electrode 210 as a negative electrode and the second electrode 220 as a positive electrode.

When the second electrode 220 has a relatively low electric potential, the first electrode 210 may function as a positive electrode.

Thus, the first electrode 210 may be a positive electrode, and the second electrode 220 may be a negative electrode.

The second electrode 220 may have a surface acting as a reaction field for the second electrode mediator 121.

In this case, the material of the second electrode 220 may be stable toward the solvent(s) and supporting salt(s) of the second liquid 120. The material of the second electrode 220 may also be resistant to an electrode reaction, that is, an electrochemical reaction. For example, the second electrode 220 may be formed of a metal or carbon. Examples of the metal include stainless steel, iron, copper, and nickel.

The second electrode 220 may have an increased surface area. Examples of such a structure with an increased surface area include meshes, nonwoven fabrics, surface-roughened sheets, and sintered porous bodies. Thus, the second electrode 220 may have a large specific surface area. This can promote an oxidation or reduction reaction of the second electrode mediator 121.

The first electrode 210 and the second electrode 220 may be formed of different materials or the same material.

The flow battery 3000 according to the third embodiment further includes the separator 400.

The separator 400 separates the first electrode 210 and the first liquid 110 from the second electrode 220 and the second liquid 120.

The separator 400 may have the structure described above in the first embodiment.

The flow battery 3000 according to the third embodiment may further include the second circulator 520.

The second circulator 520 circulates the second liquid 120 between the second electrode 220 and the second active material 320.

The second circulator 520 may include at least one second rotator and a second drive for rotating the second rotator. The second drive can rotate the second rotator. The second drive may not be in contact with the second liquid 120. The second circulator 520 may be a magnetic stirrer that includes at least one second rotator and a stirrer main body. In the second circulator 520, the second rotator may be disposed at the bottom of the positive-electrode chamber 620, and the second drive may be disposed under the positive-electrode chamber 620. The second drive may be disposed outside the positive-electrode chamber 620, and the second rotator may be disposed within the positive-electrode chamber 620.

Such a structure can circulate the second electrode mediator 121 as well as the second liquid 120 between the second electrode 220 and the second active material 320. This can efficiently promote an oxidation reaction and a reduction reaction between the materials.

A specific example of the second circulator 520 may be a structure described later in a fourth embodiment.

Charge-Discharge Process

The charge-discharge process of the flow battery 3000 according to the third embodiment will be described below.

The charge-discharge process is specifically described with the following operation example.

In the operation example, the first electrode 210 is a negative electrode made of stainless steel.

In the operation example, the first liquid 110 is an ether solution containing the charge mediator 111 and the discharge mediator 112 dissolved therein.

In the operation example, the charge mediator 111 is an aromatic compound (hereinafter referred to as ChMd).

In the operation example, the discharge mediator 112 is an aromatic compound (hereinafter referred to as DchMd).

In the operation example, the first active material 310 is graphite ($C_6Li$).

In the operation example, the second electrode 220 is a positive electrode made of stainless steel.

In the operation example, the second liquid 120 is an ether solution containing the second electrode mediator 121 dissolved therein.

In the operation example, the second electrode mediator 121 is tetrathiafulvalene (hereinafter referred to as TTF).

In the operation example, the second active material 320 is lithium iron phosphate ($LiFePO_4$).

In the operation example, the separator 400 is a lithium ion conductive solid electrolyte membrane.

Charging Process

First, a charge reaction will be described below.

A voltage is applied between the first electrode 210 and the second electrode 220 for charging.

Reaction on Positive Electrode

Voltage application causes an oxidation reaction of the second electrode mediator 121 on the positive electrode, that is, on the second electrode 220. Thus, the second electrode mediator 121 is oxidized on the surface of the second electrode 220. Thus, electrons are released from the second electrode 220 to the outside of the flow battery.

For example, the following reaction occurs in the operation example.

$$TTF \rightarrow TTF^+ + e^-$$

$$TTF^+ \rightarrow TTF^{2+} + e^-$$

The second circulator 520 transfers the second electrode mediator 121 oxidized on the second electrode 220 to the second active material 320. In other words, the second circulator 520 supplies the second electrode mediator 121 oxidized on the second electrode 220 to the second active material 320.

The second electrode mediator 121 oxidized on the second electrode 220 is reduced by the second active material 320. In other words, the second active material 320 is oxidized by the second electrode mediator 121. Thus, the second active material 320 releases lithium.

For example, the following reaction occurs in the operation example.

$$LiFePO_4 + TTF^{2+} \rightarrow FePO_4 + Li^+ + TTF^+$$

The second circulator 520 transfers the second electrode mediator 121 reduced by the second active material 320 to the second electrode 220. In other words, the second circulator 520 supplies the second electrode mediator 121 reduced by the second active material 320 to the second electrode 220.

The second electrode mediator 121 is oxidized on the surface of the second electrode 220.

For example, the following reaction occurs in the operation example.

$$TTF^+ \rightarrow TTF^{2+} + e^-$$

Lithium ions ($Li^+$) thus released may move partly to the first liquid 110 through the separator 400.

Thus, the second electrode mediator 121 is unchanged in the whole reaction including circulation.

Meanwhile, the second active material 320 separated from the second electrode 220 is charged.

Thus, $TTF^{2+}$ functions as a charge mediator on the second electrode 220.

In the fully charged state, the second liquid 120 contains $TTF^{2+}$, and the second active material 320 is $FePO_4$. The charge potential depends on the oxidation potential with respect to the direction toward $TTF^{2+}$.

Reaction on Negative Electrode

Upon application of a voltage, electrons are supplied to the negative electrode, that is, to the first electrode 210 from the outside of the flow battery. This causes a reduction reaction of the charge mediator 111 and the discharge mediator 112 on the first electrode 210.

For example, the following reaction occurs in the operation example.

$$ChMd + Li^+ + e^- \rightarrow ChMd.Li$$

$$DchMd + Li^+ + e^- \rightarrow DchMd.Li$$

The first circulator 510 transfers the charge mediator 111 reduced on the first electrode 210 to the first active material 310. In other words, the first circulator 510 supplies the charge mediator 111 reduced on the first electrode 210 to the first active material 310.

The charge mediator 111 reduced on the first electrode 210 is oxidized by the first active material 310. In other words, the first active material 310 is reduced by the charge mediator 111. Thus, the first active material 310 occludes lithium and becomes $C_6Li$.

For example, the following reaction occurs in the operation example.

$$6C + ChMd.Li \rightarrow C_6Li + ChMd$$

The first circulator 510 transfers the charge mediator 111 oxidized by the first active material 310 to the first electrode 210. In other words, the first circulator 510 supplies the charge mediator 111 oxidized by the first active material 310 to the first electrode 210.

Thus, the charge mediator 111 is unchanged in the whole reaction including circulation.

Meanwhile, the first active material 310 separated from the first electrode 210 is charged.

The charge reaction can continue until the first active material 310 or the second active material 320 reaches the fully charged state.

Discharge Process

A discharge reaction starting from the fully charged state will be described below.

In the fully charged state, the first active material 310 and the second active material 320 are in the charged state.

During the discharge reaction, electric power is generated between the first electrode 210 and the second electrode 220.

Reaction on Positive Electrode

When the flow battery is discharged, electrons are supplied to the positive electrode, that is, to the second electrode 220 from the outside of the flow battery. Thus, a reduction reaction of the second electrode mediator 121 occurs on the second electrode 220. Thus, the second electrode mediator 121 is reduced on the surface of the second electrode 220.

For example, the following reaction occurs in the operation example.

$$TTF^{2+} + e^- \rightarrow TTF^+$$

$$TTF^+ + e^- \rightarrow TTF$$

The second circulator 520 transfers the second electrode mediator 121 reduced on the second electrode 220 to the second active material 320. In other words, the second circulator 520 supplies the second electrode mediator 121 reduced on the second electrode 220 to the second active material 320.

The second electrode mediator 121 reduced on the second electrode 220 is oxidized by the second active material 320. In other words, the second active material 320 is reduced by the second electrode mediator 121. Thus, the second active material 320 occludes lithium.

For example, the following reaction occurs in the operation example.

$$FePO_4 + Li^+ + TTF \rightarrow LiFePO_4 + TTF^+$$

The second circulator 520 transfers the second electrode mediator 121 oxidized by the second active material 320 to the second electrode 220. In other words, the second circulator 520 supplies the second electrode mediator 121 oxidized by the second active material 320 to the second electrode 220.

The second electrode mediator 121 is reduced on the surface of the second electrode 220.

For example, the following reaction occurs in the operation example.

$$TTF^+ + e^- \rightarrow TTF$$

Lithium ions ($Li^+$) may be supplied partly from the first liquid 110 through the separator 400.

Thus, the second electrode mediator 121 is unchanged in the whole reaction including circulation.

Meanwhile, the second active material 320 separated from the second electrode 220 is in the discharged state.

Thus, TTF functions as a discharge mediator on the second electrode 220.

In the fully discharged state, the second liquid 120 contains TTF, and the second active material 320 is LiFePO$_4$. The discharge potential depends on the reduction potential with respect to the direction toward TTF.

Reaction on Negative Electrode

Battery discharge causes an oxidation reaction of the charge mediator 111 and the discharge mediator 112 on the negative electrode, that is, on the first electrode 210. Thus, electrons are released from the first electrode 210 to the outside of the flow battery.

For example, the following reaction occurs in the operation example.

$$DchMd.Li \rightarrow DchMd + Li^+ + e^-$$

$$ChMd.Li \rightarrow ChMd + Li^+ + e^-$$

The first circulator 510 transfers the discharge mediator 112 oxidized on the first electrode 210 to the first active material 310. In other words, the first circulator 510 supplies the discharge mediator 112 oxidized on the first electrode 210 to the first active material 310.

The discharge mediator 112 oxidized on the first electrode 210 is reduced by the first active material 310. In other words, the first active material 310 is oxidized by the discharge mediator 112. Thus, the first active material 310 releases lithium.

For example, the following reaction occurs in the operation example.

$$C_6Li + DchMd \rightarrow 6C + DchMd.Li$$

The first circulator 510 transfers the discharge mediator 112 reduced by the first active material 310 to the first electrode 210. In other words, the first circulator 510 supplies the discharge mediator 112 reduced by the first active material 310 to the first electrode 210.

Thus, the discharge mediator 112 is unchanged in the whole reaction including circulation.

Meanwhile, the first active material 310 separated from the first electrode 210 is in the discharged state.

The discharge reaction can continue until the first active material 310 or the second active material 320 reaches the fully discharged state.

Estimation of Energy Density

The estimated energy density of the flow battery 3000 according to the third embodiment will be described below.

Tables 7 to 13 list the estimated energy densities of the flow battery 3000 according to the third embodiment. These tables list the electric potential (V vs. Li/Li$^+$) of each mediator, the charge and discharge voltages (V) of the flow battery, the theoretical capacity density (Ah/L) of the flow battery, the theoretical energy density (Wh/L) of the flow battery, the volume filling factor of the electricity generating element, and the energy density (Wh/L) of the flow battery.

TABLE 7

| Negative-electrode charge mediator | (Negative-electrode active material: graphite) | | | |
| --- | --- | --- | --- | --- |
| | Biphenyl | | Phenanthrene | |
| Negative-electrode discharge mediator | 2.2'-bipyridyl | trans-stilbene | 2.2'-bipyridyl | trans-stilbene |
| Positive-electrode charge mediator (TTF+) potential | 3.7 | 3.7 | 3.7 | 3.7 |
| Positive-electrode discharge mediator (TTF) potential | 3.4 | 3.4 | 3.4 | 3.4 |
| Negative-electrode charge mediator potential | 0 | 0 | 0.03 | 0.03 |
| Negative-electrode discharge mediator potential | 0.4 | 0.3 | 0.4 | 0.3 |
| Flow battery charge voltage | 3.7 | 3.7 | 3.67 | 3.67 |
| Flow battery discharge voltage | 3 | 3.1 | 3 | 3.1 |
| Flow battery theoretical capacity density | 317 | 317 | 317 | 317 |
| Flow battery theoretical energy density | 951 | 983 | 951 | 983 |
| Volume filling factor of electricity generating element | 0.6 | 0.6 | 0.6 | 0.6 |
| Flow battery energy density | 571 | 590 | 571 | 590 |

TABLE 8

| Negative-electrode discharge mediator | 4,4'-bipyridyl | 2,4'-bipyridyl | 2,3'-bipyridyl | cis-stilbene | Aceto-phenone | (Negative-electrode active material: graphite) | | | |
| --- | --- | --- | --- | --- | --- | --- | --- | --- | --- |
| | | | | | | Propio-phenone | Butyro-phenone | Valero-phenone | Ethylene-diamine |
| | Negative-electrode charge mediator: phenanthrene | | | | | | | | |
| Positive-electrode charge mediator (TTF+) potential | 3.7 | 3.7 | 3.7 | 3.7 | 3.7 | 3.7 | 3.7 | 3.7 | 3.7 |
| Positive-electrode discharge mediator (TTF) potential | 3.4 | 3.4 | 3.4 | 3.4 | 3.4 | 3.4 | 3.4 | 3.4 | 3.4 |
| Negative-electrode charge mediator potential | 0.03 | 0.03 | 0.03 | 0.03 | 0.03 | 0.03 | 0.03 | 0.03 | 0.03 |

TABLE 8-continued (Negative-electrode active material: graphite)

| Negative-electrode discharge mediator | 4,4'-bipyridyl | 2,4'-bipyridyl | 2,3'-bipyridyl | cis-stilbene | Aceto-phenone | Propio-phenone | Butyro-phenone | Valero-phenone | Ethylene-diamine |
|---|---|---|---|---|---|---|---|---|---|
| Negative-electrode discharge mediator potential | 1.22 | 0.54 | 0.58 | 0.43 | 1.29 | 0.42 | 0.3 | 0.31 | 0.36 |
| Flow battery charge voltage | 3.67 | 3.67 | 3.67 | 3.67 | 3.67 | 3.67 | 3.67 | 3.67 | 3.67 |
| Flow battery discharge voltage | 2.18 | 2.86 | 2.82 | 2.97 | 2.11 | 2.98 | 3.1 | 3.09 | 3.04 |
| Flow battery theoretical capacity density | 317 | 318 | 319 | 320 | 321 | 322 | 323 | 324 | 325 |
| Flow battery theoretical energy density | 691.06 | 909.48 | 899.58 | 950.4 | 677.31 | 959.56 | 1001.3 | 1001.16 | 988 |
| Volume filling factor of electricity generating element | 0.6 | 0.6 | 0.6 | 0.6 | 0.6 | 0.6 | 0.6 | 0.6 | 0.6 |
| Flow battery energy density | 414.636 | 545.688 | 539.748 | 570.24 | 406.386 | 575.736 | 600.78 | 600.696 | 592.8 |
| Negative-electrode charge mediator: biphenyl | | | | | | | | | |
| Positive-electrode charge mediator (TTF+) potential | 3.7 | 3.7 | 3.7 | 3.7 | 3.7 | 3.7 | 3.7 | 3.7 | 3.7 |
| Positive-electrode discharge mediator (TTF) potential | 3.4 | 3.4 | 3.4 | 3.4 | 3.4 | 3.4 | 3.4 | 3.4 | 3.4 |
| Negative-electrode charge mediator potential | 0 | 0 | 0 | 0 | 0 | 0 | 0 | 0 | 0 |
| Negative-electrode discharge mediator potential | 1.22 | 0.54 | 0.58 | 0.43 | 1.29 | 0.42 | 0.3 | 0.31 | 0.36 |
| Flow battery charge voltage | 3.7 | 3.7 | 3.7 | 3.7 | 3.7 | 3.7 | 3.7 | 3.7 | 3.7 |
| Flow battery discharge voltage | 2.18 | 2.86 | 2.82 | 2.97 | 2.11 | 2.98 | 3.1 | 3.09 | 3.04 |
| Flow battery theoretical capacity density | 317 | 318 | 319 | 320 | 321 | 322 | 323 | 324 | 325 |
| Flow battery theoretical energy density | 691.06 | 909.48 | 899.58 | 950.4 | 677.31 | 959.56 | 1001.3 | 1001.16 | 988 |
| Volume filling factor of electricity generating element | 0.6 | 0.6 | 0.6 | 0.6 | 0.6 | 0.6 | 0.6 | 0.6 | 0.6 |
| Flow battery energy density | 414.636 | 545.688 | 539.748 | 570.24 | 406.386 | 575.736 | 600.78 | 600.696 | 592.8 |

TABLE 9

(Negative-electrode active material: graphite)

| Negative-electrode discharge mediator | 4,4'-bipyridyl | 2,4'-bipyridyl | 2,3'-bipyridyl | cis-stilbene | Aceto-phenone | Propio-phenone | Butyro-phenone | Valero-phenone | Ethylene-diamine |
|---|---|---|---|---|---|---|---|---|---|
| Negative-electrode charge mediator: triphenylene | | | | | | | | | |
| Positive-electrode charge mediator (TTF+) potential | 3.7 | 3.7 | 3.7 | 3.7 | 3.7 | 3.7 | 3.7 | 3.7 | 3.7 |
| Positive-electrode discharge mediator (TTF) potential | 3.4 | 3.4 | 3.4 | 3.4 | 3.4 | 3.4 | 3.4 | 3.4 | 3.4 |
| Negative-electrode charge mediator potential | 0.01 | 0.01 | 0.01 | 0.01 | 0.01 | 0.01 | 0.01 | 0.01 | 0.01 |
| Negative-electrode discharge mediator potential | 1.22 | 0.54 | 0.58 | 0.43 | 1.29 | 0.42 | 0.3 | 0.31 | 0.36 |
| Flow battery charge voltage | 3.69 | 3.69 | 3.69 | 3.69 | 3.69 | 3.69 | 3.69 | 3.69 | 3.69 |
| Flow battery discharge voltage | 2.18 | 2.86 | 2.82 | 2.97 | 2.11 | 2.98 | 3.1 | 3.09 | 3.04 |

TABLE 9-continued

| Negative-electrode discharge mediator | 4,4'-bipyridyl | 2,4'-bipyridyl | 2,3'-bipyridyl | cis-stilbene | Aceto-phenone | (Negative-electrode active material: graphite) Propio-phenone | Butyro-phenone | Valero-phenone | Ethylene-diamine |
|---|---|---|---|---|---|---|---|---|---|
| Flow battery theoretical capacity density | 317 | 318 | 319 | 320 | 321 | 322 | 323 | 324 | 325 |
| Flow battery theoretical energy density | 691.06 | 909.48 | 899.58 | 950.4 | 677.31 | 959.56 | 1001.3 | 1001.16 | 988 |
| Volume filling factor of electricity generating element | 0.6 | 0.6 | 0.6 | 0.6 | 0.6 | 0.6 | 0.6 | 0.6 | 0.6 |
| Flow battery energy density | 414.636 | 545.688 | 539.748 | 570.24 | 406.386 | 575.736 | 600.78 | 600.696 | 592.8 |
| Negative-electrode charge mediator: anthracene | | | | | | | | | |
| Positive-electrode charge mediator (TTF+) potential | 3.7 | 3.7 | 3.7 | 3.7 | 3.7 | 3.7 | 3.7 | 3.7 | 3.7 |
| Positive-electrode discharge mediator (TTF) potential | 3.4 | 3.4 | 3.4 | 3.4 | 3.4 | 3.4 | 3.4 | 3.4 | 3.4 |
| Negative-electrode charge mediator potential | 0.05 | 0.05 | 0.05 | 0.05 | 0.05 | 0.05 | 0.05 | 0.05 | 0.05 |
| Negative-electrode discharge mediator potential | 1.22 | 0.54 | 0.58 | 0.43 | 1.29 | 0.42 | 0.3 | 0.31 | 0.36 |
| Flow battery charge voltage | 3.65 | 3.65 | 3.65 | 3.65 | 3.65 | 3.65 | 3.65 | 3.65 | 3.65 |
| Flow battery discharge voltage | 2.18 | 2.86 | 2.82 | 2.97 | 2.11 | 2.98 | 3.1 | 3.09 | 3.04 |
| Flow battery theoretical capacity density | 317 | 318 | 319 | 320 | 321 | 322 | 323 | 324 | 325 |
| Flow battery theoretical energy density | 691.06 | 909.48 | 899.58 | 950.4 | 677.31 | 959.56 | 1001.3 | 1001.16 | 988 |
| Volume filling factor of electricity generating element | 0.6 | 0.6 | 0.6 | 0.6 | 0.6 | 0.6 | 0.6 | 0.6 | 0.6 |
| Flow battery energy density | 414.636 | 545.688 | 539.748 | 570.24 | 406.386 | 575.736 | 600.78 | 600.696 | 592.8 |

TABLE 10

(Negative-electrode active material: graphite)

| Negative-electrode discharge mediator | 2,2'-bipyridyl | trans-stilbene | 4,4'-bipyridyl | 2,4'-bipyridyl | 2,3'-bipyridyl | cis-stilbene | Aceto-phenone | Propio-phenone | Butyro-phenone | Valero-phenone | Ethylene-diamine | Benzil | Tetraphenylcyclo-pentadienone | Benzo-phenone |
|---|---|---|---|---|---|---|---|---|---|---|---|---|---|---|
| Negative-electrode charge mediator: phenanthrene | | | | | | | | | | | | | | |
| Positive-electrode charge mediator (TTF+) potential | 3.7 | 3.7 | 3.7 | 3.7 | 3.7 | 3.7 | 3.7 | 3.7 | 3.7 | 3.7 | 3.7 | 3.7 | 3.7 | 3.7 |
| Positive-electrode discharge mediator (TTF) potential | 3.4 | 3.4 | 3.4 | 3.4 | 3.4 | 3.4 | 3.4 | 3.4 | 3.4 | 3.4 | 3.4 | 3.4 | 3.4 | 3.4 |
| Negative-electrode charge mediator potential | 0.03 | 0.03 | 0.03 | 0.03 | 0.03 | 0.03 | 0.03 | 0.03 | 0.03 | 0.03 | 0.03 | 0.03 | 0.03 | 0.03 |
| Negative-electrode discharge mediator potential | 0.4 | 0.3 | 1.22 | 0.54 | 0.58 | 0.43 | 1.29 | 0.42 | 0.3 | 0.31 | 0.36 | 0.16 | 0.34 | 0.78 |
| Flow battery charge voltage | 3.67 | 3.67 | 3.67 | 3.67 | 3.67 | 3.67 | 3.67 | 3.67 | 3.67 | 3.67 | 3.67 | 3.67 | 3.67 | 3.67 |
| Flow battery discharge voltage | 3 | 3.1 | 2.18 | 2.86 | 2.82 | 2.97 | 2.11 | 2.98 | 3.1 | 3.09 | 3.04 | 3.24 | 3.06 | 2.62 |
| Flow battery theoretical capacity density | 317 | 317 | 317 | 317 | 317 | 317 | 317 | 317 | 317 | 317 | 317 | 317 | 317 | 317 |
| Flow battery theoretical energy density | 951 | 982.7 | 691.06 | 906.62 | 893.94 | 941.49 | 668.87 | 944.66 | 982.7 | 979.53 | 963.68 | 1027.08 | 970.02 | 830.54 |
| Volume filling factor of electricity generating element | 0.6 | 0.6 | 0.6 | 0.6 | 0.6 | 0.6 | 0.6 | 0.6 | 0.6 | 0.6 | 0.6 | 0.6 | 0.6 | 0.6 |
| Flow battery energy density | 570.6 | 589.62 | 414.636 | 543.972 | 536.364 | 564.894 | 401.322 | 566.796 | 589.62 | 587.718 | 578.208 | 616.248 | 582.012 | 498.324 |
| Negative-electrode charge mediator: biphenyl | | | | | | | | | | | | | | |
| Positive-electrode charge mediator (TTF+) potential | 3.7 | 3.7 | 3.7 | 3.7 | 3.7 | 3.7 | 3.7 | 3.7 | 3.7 | 3.7 | 3.7 | 3.7 | 3.7 | 3.7 |
| Positive-electrode discharge mediator (TTF) potential | 3.4 | 3.4 | 3.4 | 3.4 | 3.4 | 3.4 | 3.4 | 3.4 | 3.4 | 3.4 | 3.4 | 3.4 | 3.4 | 3.4 |
| Negative-electrode charge mediator potential | 0 | 0 | 0 | 0 | 0 | 0 | 0 | 0 | 0 | 0 | 0 | 0 | 0 | 0 |
| Negative-electrode discharge mediator potential | 0.4 | 0.3 | 1.22 | 0.54 | 0.58 | 0.43 | 1.29 | 0.42 | 0.3 | 0.31 | 0.36 | 0.16 | 0.34 | 0.78 |
| Flow battery charge voltage | 3.7 | 3.7 | 3.7 | 3.7 | 3.7 | 3.7 | 3.7 | 3.7 | 3.7 | 3.7 | 3.7 | 3.7 | 3.7 | 3.7 |
| Flow battery discharge voltage | 3 | 3.1 | 2.18 | 2.86 | 2.82 | 2.97 | 2.11 | 2.98 | 3.1 | 3.09 | 3.04 | 3.24 | 3.06 | 2.62 |
| Flow battery theoretical capacity density | 317 | 317 | 317 | 317 | 317 | 317 | 317 | 317 | 317 | 317 | 317 | 317 | 317 | 317 |
| Flow battery theoretical energy density | 951 | 982.7 | 691.06 | 906.62 | 893.94 | 941.49 | 668.87 | 944.66 | 982.7 | 979.53 | 963.68 | 1027.08 | 970.02 | 830.54 |
| Volume filling factor of electricity generating element | 0.6 | 0.6 | 0.6 | 0.6 | 0.6 | 0.6 | 0.6 | 0.6 | 0.6 | 0.6 | 0.6 | 0.6 | 0.6 | 0.6 |
| Flow battery energy density | 570.6 | 589.62 | 414.636 | 543.972 | 536.364 | 564.894 | 401.322 | 566.796 | 589.62 | 587.718 | 578.208 | 616.248 | 582.012 | 498.324 |

TABLE 11

(Negative-electrode active material: graphite)

| Negative-electrode discharge mediator | 2,2'-bipyridyl | trans-stilbene | 4,4'-bipyridyl | 2,4'-bipyridyl | 2,3'-bipyridyl | cis-stilbene | Aceto-phenone | Propio-phenone | Butyro-phenone | Valero-phenone | Ethylene-diamine | Benzil | Tetraphenylcyclo-pentadienone | Benzo-phenone |
|---|---|---|---|---|---|---|---|---|---|---|---|---|---|---|
| | | | | | | Negative-electrode charge mediator: triphenylene | | | | | | | | |
| Positive-electrode charge mediator (TTF+) potential | 3.7 | 3.7 | 3.7 | 3.7 | 3.7 | 3.7 | 3.7 | 3.7 | 3.7 | 3.7 | 3.7 | 3.7 | 3.7 | 3.7 |
| Positive-electrode discharge mediator (TTF) potential | 3.4 | 3.4 | 3.4 | 3.4 | 3.4 | 3.4 | 3.4 | 3.4 | 3.4 | 3.4 | 3.4 | 3.4 | 3.4 | 3.4 |
| Negative-electrode charge mediator potential | 0.01 | 0.01 | 0.01 | 0.01 | 0.01 | 0.01 | 0.01 | 0.01 | 0.01 | 0.01 | 0.01 | 0.01 | 0.01 | 0.01 |
| Negative-electrode discharge mediator potential | 0.4 | 0.3 | 1.22 | 0.54 | 0.58 | 0.43 | 1.29 | 0.42 | 0.3 | 0.31 | 0.36 | 0.16 | 0.34 | 0.78 |
| Flow battery charge voltage | 3.69 | 3.69 | 3.69 | 3.69 | 3.69 | 3.69 | 3.69 | 3.69 | 3.69 | 3.69 | 3.69 | 3.69 | 3.69 | 3.69 |
| Flow battery discharge voltage | 3 | 3.1 | 2.18 | 2.86 | 2.82 | 2.97 | 2.11 | 2.98 | 3.1 | 3.09 | 3.04 | 3.24 | 3.06 | 2.62 |
| Flow battery theoretical capacity density | 317 | 317 | 317 | 317 | 317 | 317 | 317 | 317 | 317 | 317 | 317 | 317 | 317 | 317 |
| Flow battery theoretical energy density | 951 | 982.7 | 691.06 | 906.62 | 893.94 | 941.49 | 668.87 | 944.66 | 982.7 | 979.53 | 963.68 | 1027.08 | 970.02 | 830.54 |
| Volume filling factor of electricity generating element | 0.6 | 0.6 | 0.6 | 0.6 | 0.6 | 0.6 | 0.6 | 0.6 | 0.6 | 0.6 | 0.6 | 0.6 | 0.6 | 0.6 |
| Flow battery energy density | 570.6 | 589.62 | 414.636 | 543.972 | 536.364 | 564.894 | 401.322 | 566.796 | 589.62 | 587.718 | 578.208 | 616.248 | 582.012 | 498.324 |
| | | | | | | Negative-electrode charge mediator: o-terphenyl | | | | | | | | |
| Positive-electrode charge mediator (TTF+) potential | 3.7 | 3.7 | 3.7 | 3.7 | 3.7 | 3.7 | 3.7 | 3.7 | 3.7 | 3.7 | 3.7 | 3.7 | 3.7 | 3.7 |
| Positive-electrode discharge mediator (TTF) potential | 3.4 | 3.4 | 3.4 | 3.4 | 3.4 | 3.4 | 3.4 | 3.4 | 3.4 | 3.4 | 3.4 | 3.4 | 3.4 | 3.4 |
| Negative-electrode charge mediator potential | 0.15 | 0.15 | 0.15 | 0.15 | 0.15 | 0.15 | 0.15 | 0.15 | 0.15 | 0.15 | 0.15 | 0.15 | 0.15 | 0.15 |
| Negative-electrode discharge mediator potential | 0.4 | 0.3 | 1.22 | 0.54 | 0.58 | 0.43 | 1.29 | 0.42 | 0.3 | 0.31 | 0.36 | 0.16 | 0.34 | 0.78 |
| Flow battery charge voltage | 3.55 | 3.55 | 3.55 | 3.55 | 3.55 | 3.55 | 3.55 | 3.55 | 3.55 | 3.55 | 3.55 | 3.55 | 3.55 | 3.55 |
| Flow battery discharge voltage | 3 | 3.1 | 2.18 | 2.86 | 2.82 | 2.97 | 2.11 | 2.98 | 3.1 | 3.09 | 3.04 | 3.24 | 3.06 | 2.62 |
| Flow battery theoretical capacity density | 317 | 317 | 317 | 317 | 317 | 317 | 317 | 317 | 317 | 317 | 317 | 317 | 317 | 317 |
| Flow battery theoretical energy density | 951 | 982.7 | 691.06 | 906.62 | 893.94 | 941.49 | 668.87 | 944.66 | 982.7 | 979.53 | 963.68 | 1027.08 | 970.02 | 315 |
| Volume filling factor of electricity generating element | 0.6 | 0.6 | 0.6 | 0.6 | 0.6 | 0.6 | 0.6 | 0.6 | 0.6 | 0.6 | 0.6 | 0.6 | 0.6 | 0.6 |
| Flow battery energy density | 570.6 | 589.62 | 414.636 | 543.972 | 536.364 | 564.894 | 401.322 | 566.796 | 589.62 | 587.718 | 578.208 | 616.248 | 582.012 | 189 |

TABLE 12

| Negative-electrode discharge mediator | 2,2'-bipyridyl | trans-stilbene | 4,4'-bipyridyl | 2,4'-bipyridyl | 2,3'-bipyridyl | cis-stilbene | Aceto-phenone | Propio-phenone | Butyro-phenone | Valero-phenone | Ethylene-diamine | Benzil | Tetraphenylcyclo-pentadienone | Benzo-phenone |
|---|---|---|---|---|---|---|---|---|---|---|---|---|---|---|
| | | | | | | Negative-electrode charge mediator: acenaphthene | | | | | | | | (Negative-electrode active material: graphite) |
| Positive-electrode charge mediator (TTF+) potential | 3.7 | 3.7 | 3.7 | 3.7 | 3.7 | 3.7 | 3.7 | 3.7 | 3.7 | 3.7 | 3.7 | 3.7 | 3.7 | 3.7 |
| Positive-electrode discharge mediator (TTF) potential | 3.4 | 3.4 | 3.4 | 3.4 | 3.4 | 3.4 | 3.4 | 3.4 | 3.4 | 3.4 | 3.4 | 3.4 | 3.4 | 3.4 |
| Negative-electrode charge mediator potential | 0.016 | 0.016 | 0.016 | 0.016 | 0.016 | 0.016 | 0.016 | 0.016 | 0.016 | 0.016 | 0.016 | 0.016 | 0.016 | 0.016 |
| Negative-electrode discharge mediator potential | 0.4 | 0.3 | 1.22 | 0.54 | 0.58 | 0.43 | 1.29 | 0.42 | 0.3 | 0.31 | 0.36 | 0.16 | 0.34 | 0.78 |
| Flow battery charge voltage | 3.684 | 3.684 | 3.684 | 3.684 | 3.684 | 3.684 | 3.684 | 3.684 | 3.684 | 3.684 | 3.684 | 3.684 | 3.684 | 3.684 |
| Flow battery discharge voltage | 3 | 3.1 | 2.18 | 2.86 | 2.82 | 2.97 | 2.11 | 2.98 | 3.1 | 3.09 | 3.04 | 3.24 | 3.06 | 2.62 |
| Flow battery theoretical capacity density | 317 | 317 | 317 | 317 | 317 | 317 | 317 | 317 | 317 | 317 | 317 | 317 | 317 | 317 |
| Flow battery theoretical energy density | 951 | 982.7 | 691.06 | 906.62 | 893.94 | 941.49 | 668.87 | 944.66 | 982.7 | 979.53 | 963.68 | 1027.08 | 970.02 | 830.54 |
| Volume filling factor of electricity generating element | 0.6 | 0.6 | 0.6 | 0.6 | 0.6 | 0.6 | 0.6 | 0.6 | 0.6 | 0.6 | 0.6 | 0.6 | 0.6 | 0.6 |
| Flow battery energy density | 570.6 | 589.62 | 414.636 | 543.972 | 536.364 | 564.894 | 401.322 | 566.796 | 589.62 | 587.718 | 578.208 | 616.248 | 582.012 | 498.324 |
| | | | | | | Negative-electrode charge mediator: acenaphthylene | | | | | | | | |
| Positive-electrode charge mediator (TTF+) potential | 3.7 | 3.7 | 3.7 | 3.7 | 3.7 | 3.7 | 3.7 | 3.7 | 3.7 | 3.7 | 3.7 | 3.7 | 3.7 | 3.7 |
| Positive-electrode discharge mediator (TTF) potential | 3.4 | 3.4 | 3.4 | 3.4 | 3.4 | 3.4 | 3.4 | 3.4 | 3.4 | 3.4 | 3.4 | 3.4 | 3.4 | 3.4 |
| Negative-electrode charge mediator potential | 0.014 | 0.014 | 0.014 | 0.014 | 0.014 | 0.014 | 0.014 | 0.014 | 0.014 | 0.014 | 0.014 | 0.014 | 0.014 | 0.014 |
| Negative-electrode discharge mediator potential | 0.4 | 0.3 | 1.22 | 0.54 | 0.58 | 0.43 | 1.29 | 0.42 | 0.3 | 0.31 | 0.36 | 0.16 | 0.34 | 0.78 |
| Flow battery charge voltage | 3.686 | 3.686 | 3.686 | 3.686 | 3.686 | 3.686 | 3.686 | 3.686 | 3.686 | 3.686 | 3.686 | 3.686 | 3.686 | 3.686 |
| Flow battery discharge voltage | 3 | 3.1 | 2.18 | 2.86 | 2.82 | 2.97 | 2.11 | 2.98 | 3.1 | 3.09 | 3.04 | 3.24 | 3.06 | 2.62 |
| Flow battery theoretical capacity density | 317 | 317 | 317 | 317 | 317 | 317 | 317 | 317 | 317 | 317 | 317 | 317 | 317 | 317 |
| Flow battery theoretical energy density | 951 | 982.7 | 691.06 | 906.62 | 893.94 | 941.49 | 668.87 | 944.66 | 982.7 | 979.53 | 963.68 | 1027.08 | 970.02 | 830.54 |
| Volume filling factor of electricity generating element | 0.6 | 0.6 | 0.6 | 0.6 | 0.6 | 0.6 | 0.6 | 0.6 | 0.6 | 0.6 | 0.6 | 0.6 | 0.6 | 0.63 |
| Flow battery energy density | 570.6 | 589.62 | 414.636 | 543.972 | 536.364 | 564.894 | 401.322 | 566.796 | 589.62 | 587.718 | 578.208 | 616.248 | 582.012 | 523.24 |

TABLE 13

| Negative-electrode discharge mediator | 2,2'-bipyridyl | trans-stilbene | 4,4'-bipyridyl | 2,4'-bipyridyl | 2,3'-bipyridyl | cis-stilbene | Aceto-phenone | Propio-phenone | Butyro-phenone | Valero-phenone | Ethylene-diamine | Benzil | Tetraphenylcyclo-pentadienone | (Negative-electrode active material: graphite) Benzo-phenone |
|---|---|---|---|---|---|---|---|---|---|---|---|---|---|---|
| | \multicolumn{14}{c}{Negative-electrode charge mediator: fluoranthene} | | | | | | | | | | | | |
| Positive-electrode charge mediator (TTF+) potential | 3.7 | 3.7 | 3.7 | 3.7 | 3.7 | 3.7 | 3.7 | 3.7 | 3.7 | 3.7 | 3.7 | 3.7 | 3.7 | 3.7 |
| Positive-electrode discharge mediator (TTF) potential | 3.4 | 3.4 | 3.4 | 3.4 | 3.4 | 3.4 | 3.4 | 3.4 | 3.4 | 3.4 | 3.4 | 3.4 | 3.4 | 3.4 |
| Negative-electrode charge mediator potential | 0.014 | 0.014 | 0.014 | 0.014 | 0.014 | 0.014 | 0.014 | 0.014 | 0.014 | 0.014 | 0.014 | 0.014 | 0.014 | 0.014 |
| Negative-electrode discharge mediator potential | 0.4 | 0.3 | 1.22 | 0.54 | 0.58 | 0.43 | 1.29 | 0.42 | 0.3 | 0.31 | 0.36 | 0.16 | 0.34 | 0.78 |
| Flow battery charge voltage | 3.686 | 3.686 | 3.686 | 3.686 | 3.686 | 3.686 | 3.686 | 3.686 | 3.686 | 3.686 | 3.686 | 3.686 | 3.686 | 3.686 |
| Flow battery discharge voltage | 3 | 3.1 | 2.18 | 2.86 | 2.82 | 2.97 | 2.11 | 2.98 | 3.1 | 3.09 | 3.04 | 3.24 | 3.06 | 2.62 |
| Flow battery theoretical capacity density | 317 | 317 | 317 | 317 | 317 | 317 | 317 | 317 | 317 | 317 | 317 | 317 | 317 | 317 |
| Flow battery theoretical energy density | 951 | 982.7 | 691.06 | 906.62 | 893.94 | 941.49 | 668.87 | 944.66 | 982.7 | 979.53 | 963.68 | 1027.08 | 970.02 | 830.54 |
| Volume filling factor of electricity generating element | 0.6 | 0.6 | 0.6 | 0.6 | 0.6 | 0.6 | 0.6 | 0.6 | 0.6 | 0.6 | 0.6 | 0.6 | 0.6 | 0.6 |
| Flow battery energy density | 570.6 | 589.62 | 414.636 | 543.972 | 536.364 | 564.894 | 401.322 | 566.796 | 589.62 | 587.718 | 578.208 | 616.248 | 582.012 | 498.324 |
| | \multicolumn{14}{c}{Negative-electrode charge mediator: anthracene} | | | | | | | | | | | | |
| Positive-electrode charge mediator (TTF+) potential | 3.7 | 3.7 | 3.7 | 3.7 | 3.7 | 3.7 | 3.7 | 3.7 | 3.7 | 3.7 | 3.7 | 3.7 | 3.7 | 3.7 |
| Positive-electrode discharge mediator (TTF) potential | 3.4 | 3.4 | 3.4 | 3.4 | 3.4 | 3.4 | 3.4 | 3.4 | 3.4 | 3.4 | 3.4 | 3.4 | 3.4 | 3.4 |
| Negative-electrode charge mediator potential | 0.05 | 0.05 | 0.05 | 0.05 | 0.05 | 0.05 | 0.05 | 0.05 | 0.05 | 0.05 | 0.05 | 0.05 | 0.05 | 0.05 |
| Negative-electrode discharge mediator potential | 0.4 | 0.3 | 1.22 | 0.54 | 0.58 | 0.43 | 1.29 | 0.42 | 0.3 | 0.31 | 0.36 | 0.16 | 0.34 | 0.78 |
| Flow battery charge voltage | 3.65 | 3.65 | 3.65 | 3.65 | 3.65 | 3.65 | 3.65 | 3.65 | 3.65 | 3.65 | 3.65 | 3.65 | 3.65 | 3.65 |
| Flow battery discharge voltage | 3 | 3.1 | 2.18 | 2.86 | 2.82 | 2.97 | 2.11 | 2.98 | 3.1 | 3.09 | 3.04 | 3.24 | 3.06 | 2.62 |
| Flow battery theoretical capacity density | 317 | 317 | 317 | 317 | 317 | 317 | 317 | 317 | 317 | 317 | 317 | 317 | 317 | 317 |
| Flow battery theoretical energy density | 951 | 982.7 | 691.06 | 906.62 | 893.94 | 941.49 | 668.87 | 944.66 | 982.7 | 979.53 | 963.68 | 1027.08 | 970.02 | 830.54 |
| Volume filling factor of electricity generating element | 0.6 | 0.6 | 0.6 | 0.6 | 0.6 | 0.6 | 0.6 | 0.6 | 0.6 | 0.6 | 0.6 | 0.6 | 0.6 | 0.6 |
| Flow battery energy density | 570.6 | 589.62 | 414.636 | 543.942 | 536.364 | 564.894 | 401.322 | 566.796 | 589.62 | 587.718 | 578.208 | 616.248 | 582.012 | 498.324 |

Tables 7 and 10 list the estimated energy densities of the flow battery 3000 according to the third embodiment under the operation example conditions. The charge mediator 111 is biphenyl or phenanthrene, and the discharge mediator 112 is 2,2'-bipyridyl or trans-stilbene.

As shown in Table 7, when the charge mediator 111 is biphenyl or phenanthrene, and the discharge mediator 112 is 2,2'-bipyridyl, the energy density of the flow battery is estimated to be 571 Wh/L.

As shown in Table 7, when the charge mediator 111 is biphenyl or phenanthrene, and the discharge mediator 112 is trans-stilbene, the energy density of the flow battery is estimated to be 590 Wh/L.

In contrast, known flow batteries (utilizing vanadium) have a theoretical energy density of approximately 38 Wh/L. Thus, the flow batteries according to the present disclosure have significantly higher theoretical energy densities than the known flow batteries.

Fourth Embodiment

A fourth embodiment will be described below. The contents described in the first to third embodiments are appropriately omitted to avoid overlap.

Figure 4:
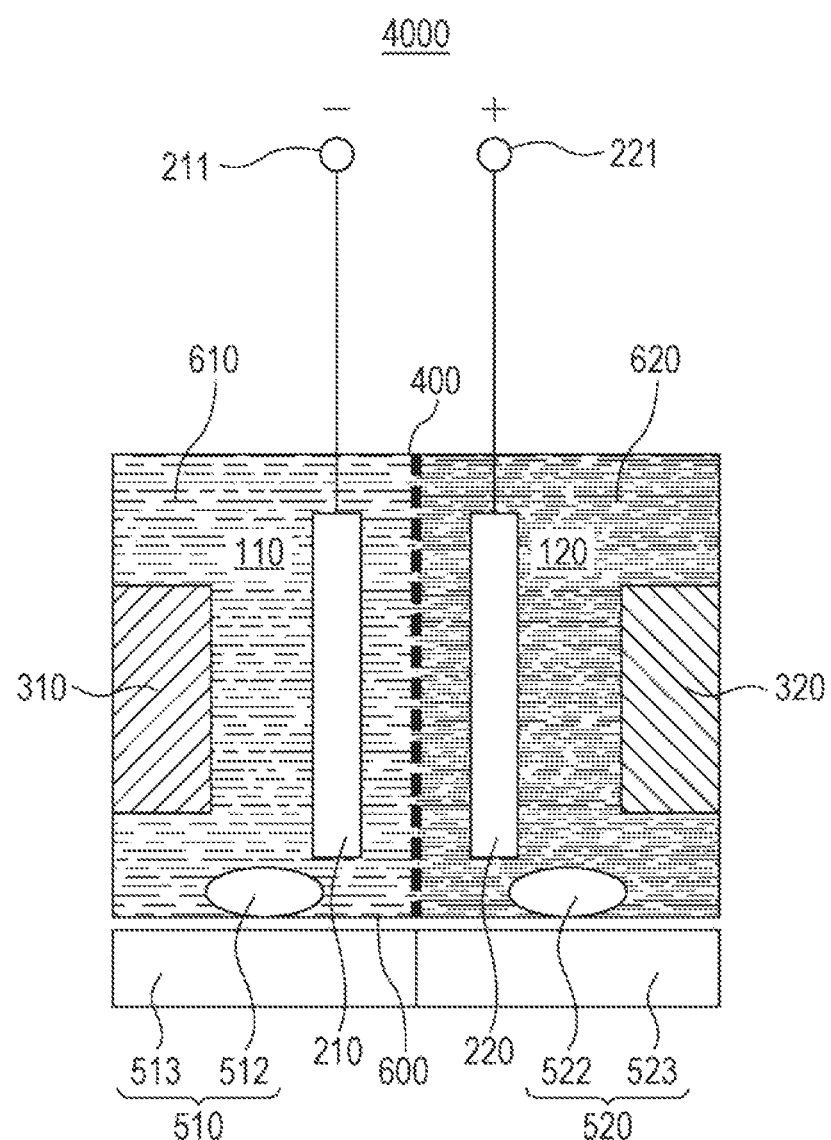
FIG. 4 is a schematic view of a flow battery according to a fourth embodiment.

FIG. 4 is a schematic view of a flow battery 4000 according to the fourth embodiment.

In addition to the components of the flow battery 3000 according to the third embodiment, the flow battery 4000 according to the fourth embodiment further includes the following components.

The flow battery 4000 according to the fourth embodiment includes the first circulator 510 described in the second embodiment.

The flow battery 4000 according to the fourth embodiment further includes the cell 600, the positive-electrode terminal 221, and the negative-electrode terminal 211 described in the second embodiment.

The flow battery 4000 according to the fourth embodiment further includes the second circulator 520 and the positive-electrode chamber 620 (corresponding to a second housing portion 521 in the third embodiment).

The second active material 320 and the second liquid 120 are contained in the positive-electrode chamber 620.

The second circulator 520 circulates the second liquid 120 between the second electrode 220 and the positive-electrode chamber 620.

Contact between the second active material 320 and the second liquid 120 in the positive-electrode chamber 620 causes oxidation and reduction of the second electrode mediator 121 with the second active material 320.

In such a structure, the second liquid 120 can come into contact with the second active material 320 in the positive-electrode chamber 620. This can increase the contact area between the second liquid 120 and the second active material 320, for example. This can also increase the contact time between the second liquid 120 and the second active material 320. This can efficiently promote an oxidation reaction and a reduction reaction of the second electrode mediator 121 with the second active material 320.

The positive-electrode chamber 620 may contain the second liquid 120, which contains the second electrode mediator 121 dissolved therein, in voids of the second active material 320.

As illustrated in FIG. 4, in the flow battery 4000 according to the fourth embodiment, the second circulator 520 may include at least one second rotator 522 and a second drive 523 for rotating the second rotator 522. The second rotator 522 may be housed in the positive-electrode chamber 620. The second drive 523 may not be in contact with the second liquid 120. In other words, the second drive 523 may be disposed outside the positive-electrode chamber 620, and the second rotator 522 may be disposed within the positive-electrode chamber 620. The number of second rotators 522 in the positive-electrode chamber 620 is one or more and may be two or more. The second circulator 520 may be a magnetic stirrer that includes at least one second rotator 522 and a stirrer main body. When the second circulator 520 is a magnetic stirrer, the second drive 523 is a stirrer main body.

The stirrer main body 523 of the magnetic stirrer may be disposed under the positive-electrode chamber 620 in such a manner as not to come into contact with the second liquid 120. The second rotator 522 is disposed at the bottom of the positive-electrode chamber 620. Thus, the stirrer main body 523 is disposed outside the positive-electrode chamber 620, and the second rotator 522 is disposed within the positive-electrode chamber 620.

Such a structure can prevent the second active material 320 from flowing out of the positive-electrode chamber 620 (for example, to the second electrode 220). Thus, the second active material 320 remains in the positive-electrode chamber 620. Thus, the second active material 320 is not circulated in the flow battery. This can prevent clogging of a component (for example, a pipe) in the second circulator 520 with the second active material 320.

The material of the second rotator 522 may be a material that does not react with the second active material 320 or the second liquid 120. The material of the second rotator 522 may be stainless steel, which does not react with metallic lithium, or a material covered with polyethylene, polypropylene, or poly(vinylidene difluoride). When the second electrode 220 is a positive electrode, the material of the second rotator 522 may be polytetrafluoroethylene. The second rotator 522 may have a center belt, roller, octagonal ring, rugby ball, stick, round, slim end, star head, or cross shape.

The second drive 523 of the second circulator 520 can drive the second rotator 522 without coming into contact with the second liquid 120 and can thereby circulate the second liquid 120 in the positive-electrode chamber 620 without using a pump. Thus, the present embodiment is different from a system equipped with a pump a component (for example, a gasket) of which comes into contact with the second liquid 120 and deteriorates due to a reaction. This can also prevent liquid leakage to the outside.

Such a structure can prevent the second active material 320 from flowing out of the positive-electrode chamber 620 even when the flow of the second liquid 120 causes the flow of the second active material 320 in the positive-electrode chamber 620.

Thus, the second electrode mediator 121 dissolved in the second liquid 120 is oxidized or reduced on the second electrode 220.

Subsequently, the second liquid 120 containing the oxidized or reduced second electrode mediator 121 dissolved therein is supplied to the positive-electrode chamber 620.

Thus, the second electrode mediator 121 dissolved in the second liquid 120 is oxidized or reduced by the second active material 320.

In FIG. 4, by way of example, the first electrode 210 is a negative electrode, and the second electrode 220 is a positive electrode.

When the second electrode 220 has a relatively low electric potential, the first electrode 210 may function as a positive electrode.

Thus, the first electrode 210 may be a positive electrode, and the second electrode 220 may be a negative electrode.

The constituents described in the first to forth embodiments may be appropriately combined.

Liquid leakage from a flow battery containing a lithium biphenyl solution containing an aromatic compound biphenyl, which can be used as the charge mediator 111, and metallic lithium dissolved therein, and the color change of the lithium biphenyl solution due to a reaction with a resin component of a pump were examined by the following method.

0.1 M biphenyl and 1 M $LiPF_6$, which is an electrolyte salt, were dissolved in 2-methyltetrahydrofuran (2MeTHF). An excessive amount of metallic lithium was immersed in the solution. A lithium biphenyl solution containing a saturating amount of lithium dissolved therein was thus prepared. The solution was poured into a housing portion, which also functioned as an electrochemical reaction unit. After the solution in the housing portion was circulated with a magnetic stirrer for 1 week (method 1), liquid leakage and the color change of the solution due to a reaction with a component were visually examined. Liquid leakage and the color change of the solution due to a reaction with a component were also visually examined in the case where the solution was circulated with a plunger pump (method 2) or a diaphragm pump (method 3) between the electrode and the housing portion containing the active material and the solution. The plunger pump and the diaphragm pump have high flow rate controllability and quantitative performance. Table 14 shows the results.

TABLE 14

| Evaluation items | Method 1 | Method 2 | Method 3 |
|---|---|---|---|
| Liquid leakage | No | Yes | No |
| Liquid color change | No | Slightly | Yes |

Table 14 shows that the method 1 involving circulation with the magnetic stirrer in the housing portion, which also functions as an electrochemical reaction unit, had no liquid leakage and no color change of the solution. In contrast, the method 2 involving circulation with the pump had liquid leakage in approximately 3 days, and the method 3 involving circulation with the pump had a color change of the solution in approximately 1 day. Liquid leakage and the color change of the solution in the method 2 were due to abrasion in the plunger and degradation of a seal. The color change of the solution in the method 3 was due to a reaction with a resin of the diaphragm.

The method 1 can result in a flow battery with high energy density and high reliability.

The constituents described in the first to forth embodiments may be appropriately combined.

A flow battery according to the present disclosure can be used for charge storage devices, for example.

What is claimed is:
1. A flow battery comprising:
   a cell including a first chamber and a second chamber;
   a first liquid that contains a charge mediator and a discharge mediator, and that is located in the first chamber of the cell;
   a first electrode located in the first chamber of the cell;
   a first active material that is solid and that is at least partly immersed in the first liquid in the first chamber of the cell;
   a second liquid located in the second chamber of the cell;
   a second electrode that is located in the second chamber of the cell, and that is a counter electrode to the first electrode; and
   a first stirrer that stirs the first liquid in the first chamber,
   wherein the charge mediator has a lower equilibrium potential than an equilibrium potential of the first active material, and
   the discharge mediator has a higher equilibrium potential than the equilibrium potential of the first active material.
2. The flow battery according to claim 1, wherein
   the first stirrer includes at least one first rotator and a first drive for rotating the at least one first rotator,
   the at least one first rotator is located in the first chamber, and
   the first drive is not in contact with the first liquid.
3. The flow battery according to claim 1, wherein the first stirrer includes a magnetic stirrer.
4. The flow battery according to claim 1, wherein the first liquid, the first electrode, and the first active material cause an electrochemical reaction in the first chamber during charging and discharging.
5. The flow battery according to claim 1, wherein
   the first liquid contains lithium,
   the first active material is a material capable of occluding and releasing the lithium,
   during charging, the charge mediator is reduced on the first electrode, the charge mediator reduced on the first electrode is oxidized by the first active material, and the first active material occludes the lithium, and
   during discharging, the first active material into which the lithium is occluded reduces the discharge mediator, the first active material releases the lithium, and the discharge mediator reduced by the first active material is oxidized on the first electrode.
6. The flow battery according to claim 5, wherein
   during the charging, the discharge mediator is reduced on the first electrode, and
   during the discharging, the charge mediator is oxidized on the first electrode.
7. The flow battery according to claim 1, wherein
   the charge mediator and the discharge mediator each independently contain an aromatic compound, and
   the first liquid causes a solvated electron of lithium to be released and dissolves the lithium as a cation.
8. The flow battery according to claim 7, wherein
   the charge mediator contains at least one selected from the group consisting of phenanthrene, biphenyl, o-terphenyl, triphenylene, anthracene, acenaphthene, acenaphthylene, and fluoranthene.
9. The flow battery according to claim 1, wherein
   the discharge mediator contains at least one selected from the group consisting of 2,2'-bipyridyl, trans-stilbene, 2,4'-bipyridyl, 2,3'-bipyridyl, cis-stilbene, propiophenone, butyrophenone, valerophenone, ethylenediamine, benzil, and tetraphenylcyclopentadienone.
10. The flow battery according to claim 1, wherein the first liquid contains an ether solution.
11. The flow battery according to claim 1, wherein the first active material contains graphite.

12. The flow battery according to claim 1, further comprising:
- a second active material at least partly immersed in the second liquid in the second chamber, and
- a separator that separates the first chamber from the second chamber,
- wherein the second liquid contains a second electrode mediator,
- the second electrode mediator is oxidized and reduced on the second electrode, and
- the second electrode mediator is oxidized and reduced by the second active material.

13. The flow battery according to claim 12, wherein
the second liquid contains lithium,
the second active material is a material capable of occluding and releasing,
during charging, the second electrode mediator is oxidized on the second electrode, the second electrode mediator oxidized on the second electrode is reduced by the second active material, and the second active material releases the lithium, and
during discharging, the second electrode mediator is reduced on the second electrode, the second electrode mediator reduced on the second electrode is oxidized by the second active material, and the second active material occludes the lithium.

14. The flow battery according to claim 12, wherein
the second electrode mediator contains tetrathiafulvalene.

15. The flow battery according to claim 12, wherein
the second active material contains lithium iron phosphate.

16. The flow battery according to claim 12, further comprising:
- a second stirrer for stirring the second liquid in the second chamber,
- wherein the second active material contacts with the second liquid in the second chamber, so that the second electrode mediator is oxidized and reduced by the second active material.

17. The flow battery according to claim 16, wherein
the second stirrer includes at least one second rotator and a second drive for rotating the at least one second rotator, and
the at least one second rotator is located in the second chamber, and the second drive is not in contact with the second liquid.

* * * * *